United States Patent
Ui

(10) Patent No.: US 11,632,161 B2
(45) Date of Patent: Apr. 18, 2023

(54) COMMUNICATION APPARATUS, CONTROL METHOD, AND PROGRAM

(71) Applicant: CANON KABUSHIKI KAISHA, Tokyo (JP)

(72) Inventor: Yutaka Ui, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/698,615

(22) Filed: Mar. 18, 2022

(65) Prior Publication Data

US 2022/0209841 A1 Jun. 30, 2022

Related U.S. Application Data

(63) Continuation of application No. 16/847,957, filed on Apr. 14, 2020, now Pat. No. 11,303,342, which is a continuation of application No. PCT/JP2018/037856, filed on Oct. 11, 2018.

(30) Foreign Application Priority Data

Oct. 19, 2017 (JP) .............................. JP2017-203004

(51) Int. Cl.
 *H04B 7/02* (2018.01)
 *H04B 7/06* (2006.01)
 *H04B 7/08* (2006.01)

(52) U.S. Cl.
 CPC ......... *H04B 7/0689* (2013.01); *H04B 7/0871* (2013.01)

(58) Field of Classification Search
 CPC .. H04B 7/0689; H04B 7/0871; H04B 7/0617; H04B 7/088; H04B 7/0695; H04W 16/28; H04W 24/04; H04W 84/12

USPC .......................................................... 375/267
See application file for complete search history.

(56) References Cited

U.S. PATENT DOCUMENTS

| 6,173,190 B1* | 1/2001 | Usui ..................... H01Q 3/26 455/562.1 |
| 2006/0252381 A1* | 11/2006 | Sasaoka ............... H04W 12/50 455/78 |
| 2010/0329163 A1 | 12/2010 | Aoki |

(Continued)

FOREIGN PATENT DOCUMENTS

| CN | 1383631 A | 12/2002 |
| CN | 102349244 A | 2/2012 |

*Primary Examiner* — Helene E Tayong
(74) *Attorney, Agent, or Firm* — Canon U.S.A., Inc. IP Division

(57) ABSTRACT

A communication apparatus capable of wireless communication with another communication apparatus via a first communication path and a second communication path sets a directivity of an antenna to a first directivity capable of wireless communication via the first communication path and receives data from the another communication apparatus via the first communication path. When the communication apparatus sends an acknowledgement signal to the another communication apparatus via the first communication path in response to reception of the data, the communication apparatus sets the directivity of the antenna to a second directivity capable of wireless communication via the first communication path and wireless communication via the second communication path for a set period thereafter.

12 Claims, 13 Drawing Sheets

(56) References Cited

U.S. PATENT DOCUMENTS

| | | | |
|---|---|---|---|
| 2011/0075747 A1* | 3/2011 | Mihota | H04B 7/0413 |
| | | | 375/260 |
| 2011/0188452 A1* | 8/2011 | Borleske | H04W 40/04 |
| | | | 370/328 |
| 2012/0220239 A1 | 8/2012 | Hosoya et al. | |
| 2012/0224542 A1* | 9/2012 | Inohiza | H04B 7/0695 |
| | | | 370/329 |

* cited by examiner

COMMUNICATION APPARATUS, CONTROL METHOD, AND PROGRAM

CROSS-REFERENCE TO RELATED APPLICATIONS

This application is a continuation of U.S. patent application Ser. No. 16/847,957 filed Apr. 14, 2020, which is a continuation of International Patent Application No. PCT/JP2018/037856, filed on Oct. 11, 2018, which claims the benefit of Japanese Patent Application No. 2017-203004, filed on Oct. 19, 2017, both of which are hereby incorporated by reference herein in their entirety.

TECHNICAL FIELD

The present invention relates to a wireless communication technology.

BACKGROUND ART

With an increase in image quality in recent years, there is a growing demand for a technology to wirelessly transmit bulk data at high-speed transmission rates. A wireless communication technology using a 60-GHz band, called millimeter wave, is known as a technology for achieving high-speed wireless transmission rates, high-speed transmission rates of up to about 6.8 Gbps can be achieved by using IEEE 802.11ad that is a millimeter wave wireless communication standard. For millimeter-wave wireless communication, there is a technology for expanding a communication range by concentrating energy in a specific direction with a beam directional antenna capable of beam steering as a communication antenna. Although millimeter-wave wireless communication is able to achieve high-speed wireless transmission rates, there is a problem that a communication path is blocked by an obstacle, such as a human body, because of the straightness of millimeter waves and, as a result, a communication error occurs.

From the above viewpoints, for millimeter-wave wireless communication, a system configuration having an auxiliary communication path is useful in order to prevent breakdown of communication due to communication path interruption. In a system having an auxiliary communication path, a high-speed switching from a main path to the auxiliary path is used in the event of communication path interruption to reduce influence on the throughput and delay time of the system. Particularly, at the time of performing data communication with a beam directional antenna, timing and conditions for switching the antenna directivity between beam directivity and omni-directivity need to be appropriately determined.

PTL 1 describes a technology for providing a plurality of communication paths between apparatuses and, after data is transmitted through each path at every predetermined time, an ACK frame is received through each path, and then the communication path that performs data transmission is determined based on a result as to whether the ACK frame is received.

However, with the method of PTL 1, communication using a communication path different from an optimal communication path needs to be periodically performed, so more than necessary useless communication occurs.

On the other hand, when a periodic check of communication paths is omitted and a main path is switched to an auxiliary path only when the main path is interrupted, one of the communication apparatuses, which has found the interruption, switches the beam direction to the auxiliary path but the other one of the communication apparatuses may not have switched the beam direction to the auxiliary path. In this case, communication cannot be performed by using the auxiliary path.

CITATION LIST

Patent Literature

PTL 1 PCT Japanese Translation Patent Publication No. 2010-531090

SUMMARY OF INVENTION

In view of such a problem, it is an object of the present invention to make it possible to, in a wireless communication system including a plurality of communication paths, further reliably switch from one of the communication paths to the other one of the communication paths at high speed in the event of interruption of the one of the communication paths.

For the above object, a communication apparatus of the present invention is a communication apparatus capable of wireless communication with another communication apparatus via a first communication path and a second communication path and includes: a receiving unit configured to set a directivity of an antenna to a first directivity capable of wireless communication via the first communication path and receive data from the another communication apparatus via the first communication path; a sending unit configured to send an acknowledgement signal to the another communication apparatus via the first communication path in response to reception of data by the receiving unit; and a setting unit configured to, after the acknowledgement signal is sent by the sending unit, set the directivity of the antenna to a second directivity capable of wireless communication via the first communication path and wireless communication via the second communication path for a set period.

A communication apparatus of the present invention is also a communication apparatus capable of wireless communication with another communication apparatus via a first communication path and a second communication path and includes: a receiving unit configured to set a directivity of an antenna to a first directivity capable of wireless communication via the first communication path and receive data from the another communication apparatus via the first communication path; and a determination unit configured to determine, based on a length of data received by the receiving unit, whether to, when changing the directivity of the antenna from the first directivity to a second directivity capable of wireless communication via the second communication path, switch the directivity after sending a switch request to switch the communication path to the another communication apparatus or to switch the directivity without sending the switch request.

Further features of the present invention will become apparent from the following description of exemplary embodiments with reference to the attached drawings.

DESCRIPTION OF EMBODIMENTS

First Embodiment

Figure 1:
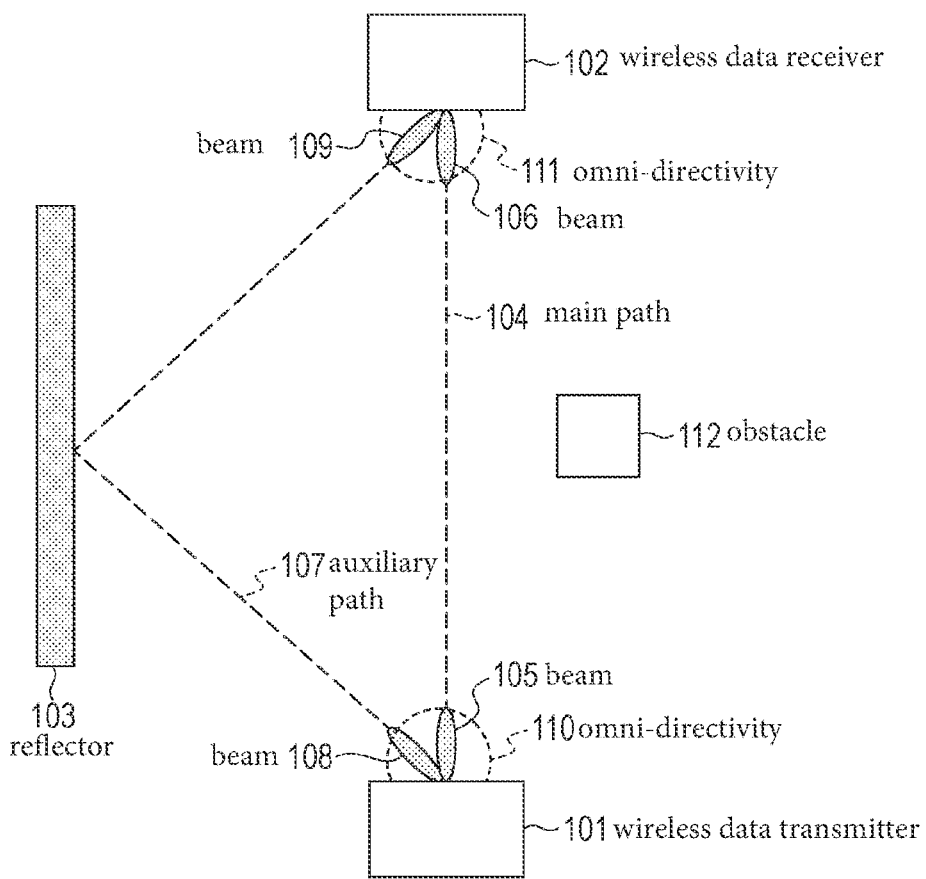
FIG. 1 is a wireless system configuration diagram according to a first embodiment of the present invention.

FIG. 1 is a diagram that shows a configuration example of a wireless communication system according to an embodiment of the present invention.

The wireless communication system includes a wireless data transmitter 101 including a directional antenna capable of forming a beam and a wireless data receiver 102 including a directional antenna capable of forming a beam. The wireless data transmitter 101 and the wireless data receiver 102 are communication apparatuses that communicate in a wireless communication scheme using the directional antennas. The wireless data transmitter 101 transmits signals of high-speed data rates, such as high-resolution video data, to the wireless data receiver 102. The wireless communication scheme is, for example, a communication scheme compliant with IEEE 802.11ad standard; however, the wireless communication scheme is not limited to IEEE 802.11ad standard as long as the wireless communication scheme uses the directional antennas.

The wireless data transmitter 101 is able to form a plurality of beams having different directions of maximum radiation, including a beam 105 and a beam 108, as highly directional (directional) antennas. The wireless data transmitter 101 is further able to form an omni-directivity 110 as an omni-directional (nondirectional) antenna and a sector directivity narrower in peak width at half height than the omni-directivity and wider in peak width at half height than the beam directivity. Similarly, the wireless data receiver 102 is able to form a plurality of beams having different directions of maximum radiation, including a beam 106 and a beam 109, as highly directional antennas, form an omni-directivity 111 as an omni-directional antenna, and form a sector directivity.

The wireless data transmitter 101 and the wireless data receiver 102 are able to perform high-speed data transmission via a main path 104 or an auxiliary path 107. As a method of determining a main path or an auxiliary path, a path having a high SNR for wireless signals is set as a main path, and a path having a lower SNR is set as an auxiliary path. To use the main path 104, the wireless data transmitter 101 forms the beam 105, the wireless data receiver 102 forms the beam 106, and the beams need to face each other to increase a received signal power. Similarly, to use the auxiliary path 107 passing by way of a reflector 103, the wireless data transmitter 101 needs to form the beam 108, and the wireless data receiver 102 needs to form the beam 109. In addition, the wireless data transmitter 101 and the wireless data receiver 102 each are able to perform low-speed data transmission by using the omni-directional antenna via any one of the main path 104, the auxiliary path 107, and a communication path passing by way of a ceiling, a floor surface, or a reflector. A received signal power decreases when the omni-directional antenna is used as compared to when the beam directional antenna is used, so the wireless data transmitter 101 and the wireless data receiver 102 each cannot perform high-resolution video data transmission, or the like, however, the wireless data transmitter 101 and the wireless data receiver 102 each are able to transmit signals of low bit rates, such as control signals, as low-speed signal transmission. As described above, the wireless data transmitter 101 and the wireless data receiver 102 in the present embodiment each are able to set the directivity of the antenna to the directivity (105 or 106) capable of wireless communication via the main path 104. Similarly, the wireless data transmitter 101 and the wireless data receiver 102 each are able to set the directivity of the antenna to the directivity (108 or 109) capable of wireless communication via the auxiliary path 107. The wireless data transmitter 101 and the wireless data receiver 102 each are able to set the directivity of the antenna to the directivity (110 or 111) capable of wireless communication via any one of the main path 104 and the auxiliary path 107. The directivity capable of wireless communication via the communication path of any one of the communication paths 104, 107 may be a directivity capable of wireless communication via at least both the communication paths 104, 107, and is not limited to an omni-directivity (non-directivity).

In the present embodiment, when an obstacle 112 enters the main path 104 and interrupts the communication path, the wireless data transmitter 101 and the wireless data receiver 102 perform data communication by switching the communication path to the auxiliary path 107. When the main path 104 and the auxiliary path 107 are interrupted at the same time, the wireless data transmitter 101 and the wireless data receiver 102 search for a new path through low-speed signal transmission by using the omni-directional antenna. To achieve these operations, after transmission of an ACK frame after reception of data, the wireless data transmitter 101 and the wireless data receiver 102 each execute the operation to receive a frame notifying path interruption by using the omni-directional antenna for a set period. The wireless data transmitter 101 and the wireless data receiver 102 each select any one of continuously using the main path, switching to the auxiliary path, or searching for a new path based on the presence or absence of a frame received and the details of the frame. Thus, the wireless data transmitter 101 and the wireless data receiver 102 are able to switch the communication path within a predetermined period according to the presence or absence of trouble and the details of the trouble, so path switching caused by communication interruption can be achieved at high speed.

Figure 2:
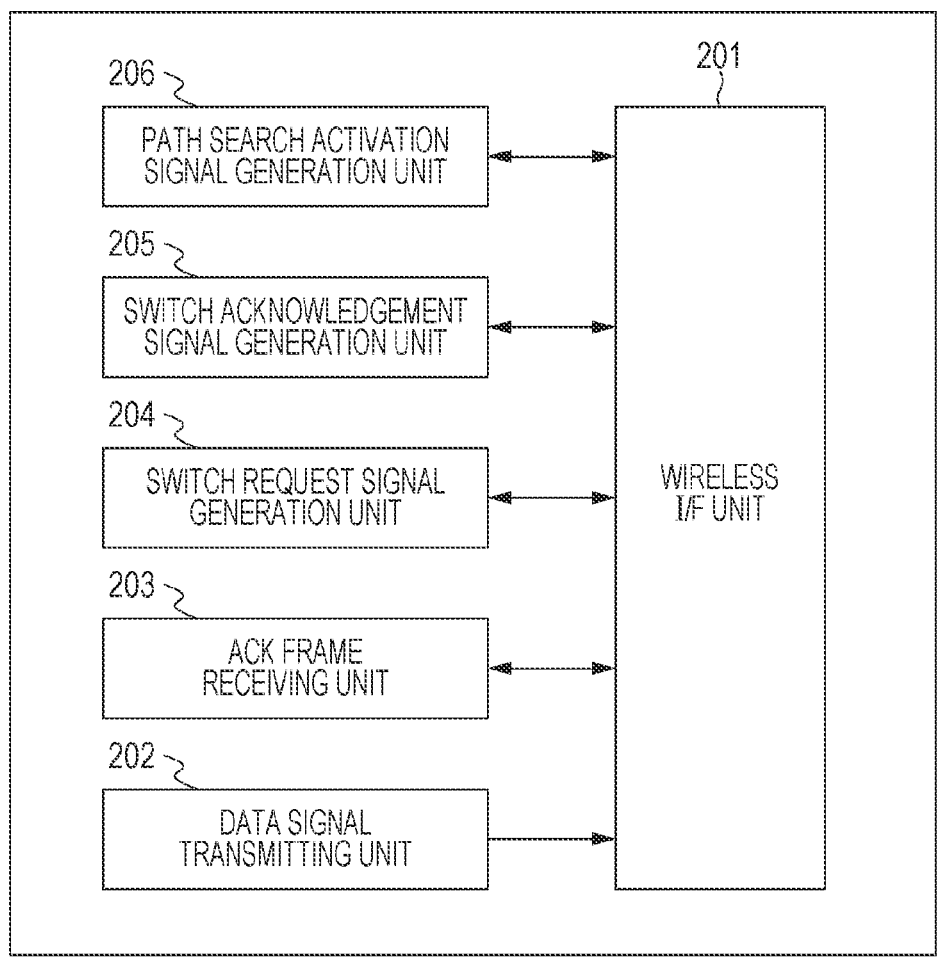
FIG. 2 is a configuration diagram of a wireless data transmitter according to the first embodiment of the present invention.

Hereinafter, the wireless data transmitter 101 will be described. FIG. 2 is a diagram that shows the functional configuration of the wireless data transmitter 101.

A wireless I/F unit 201 of the wireless data transmitter 101 includes an array antenna capable of setting the omni-directivity and the beam directivity in a selected direction. The wireless I/F unit 201 includes an analog-to-digital converter that converts a received analog signal to a digital signal. The wireless I/F unit 201 includes a digital-to-analog signal converter that converts a digital signal generated by each of a switch request signal generation unit 204, a switch acknowledgement signal generation unit 205, and a path search activation signal generation unit 206 to an analog signal. Furthermore, the wireless I/F unit 201 includes a wireless signal processing circuit that generates and acquires a wireless signal that is used to perform wireless communication with the wireless data receiver 102.

Hereinafter, a wireless signal used to perform wireless communication will be described together with a procedure of starting wireless communication and a procedure of performing wireless communication. Hereinafter, description will be made on the assumption that the wireless data transmitter 101 is a control station and the wireless data receiver 102 is a slave; however, opposite roles may be assigned to the wireless data transmitter 101 and the wireless data receiver 102.

Figure 4:
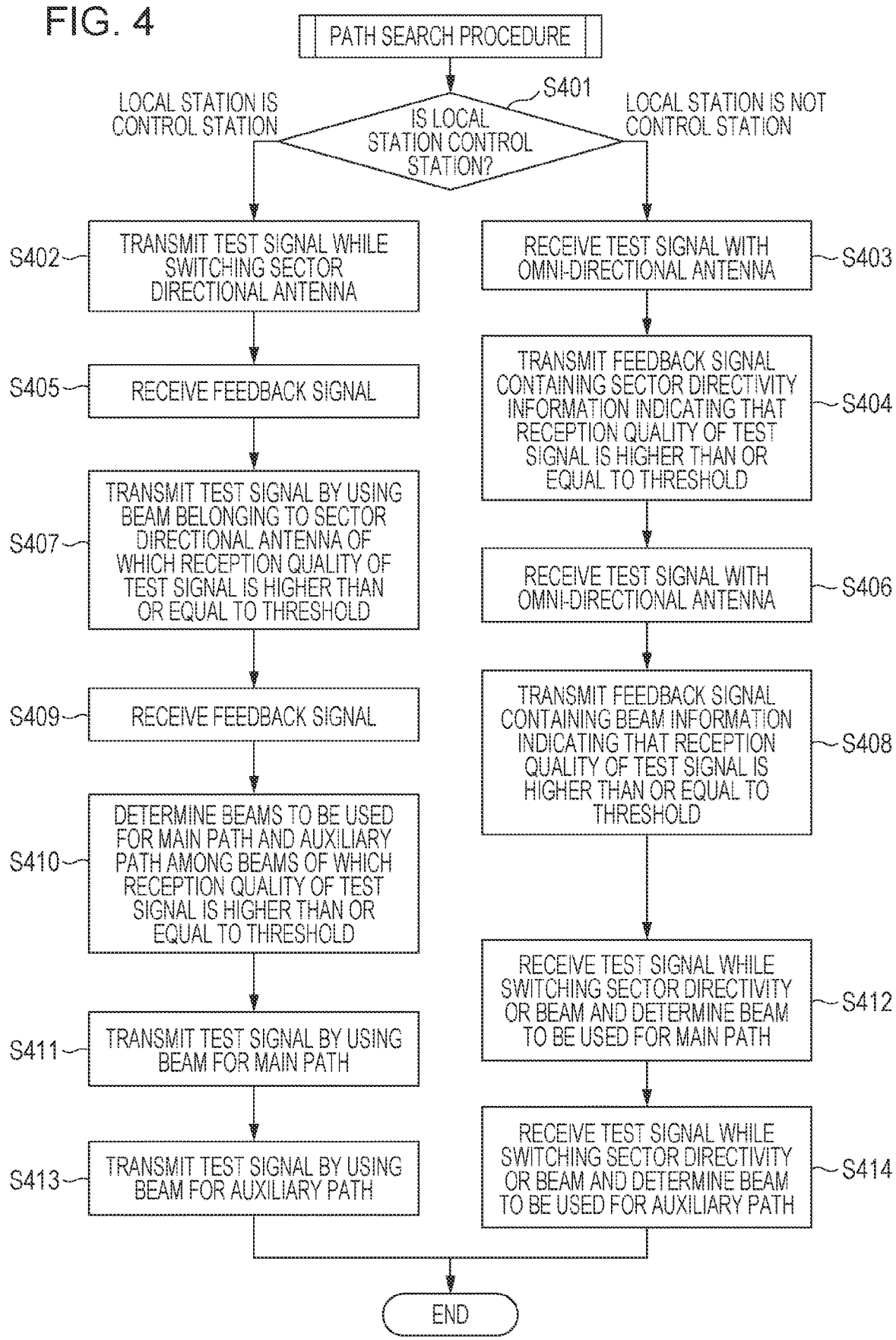
FIG. 4 is a view that shows a path search procedure according to the first embodiment of the present invention.

The wireless data transmitter 101 periodically transmits a beacon frame and causes the wireless data receiver 102 to join a network. After the wireless data receiver 102 joins the network, the wireless data transmitter 101 and the wireless data receiver 102 make a path search. FIG. 4 is a flowchart that shows a path search procedure that is performed between the wireless data transmitter 101 and the wireless data receiver 102.

In S401, the wireless data transmitter 101 determines whether a local station is a control station, and, as a result, proceeds to S402 because the local station is a control station. In S401, the wireless data receiver 102 determines whether the local station is a control station and, as a result, proceeds to S403 because the local station is not a control station. In S402, the wireless data transmitter 101 transmits a test signal while switching the sector directivity. The test signal contains the MAC address of the wireless data transmitter 101, the MAC address of the wireless data receiver 102, the remaining number of times a test signal is transmitted, and the identification information of the sector directional antenna. In S403, the wireless data receiver 102 sets the directivity of the receiving antenna to the omni-directivity and receives the test signal.

In S404, the wireless data receiver 102 generates a feedback signal describing the identification information of the sector directivity at the time of reception of which the reception quality is higher than or equal to a threshold among the received test signals and a received signal power and transmits the feedback signal to the wireless data transmitter 101. The threshold that is used to evaluate the reception quality is determined based on the antenna gain of the omni-directivity, the antenna gain of the sector directivity, the antenna gain of the beam directivity, and an SNR used for a modulation scheme to be used in data communication. For example, where the SNR used during data communication is 40 dB, the antenna gain of the omni-directivity is 5 dBi, the antenna gain of the sector directivity is 8 dBi, and the antenna gain of the beam directivity is 20 dBi, the threshold is 13 dB. In other words, when the SNR in the case where a test signal is transmitted with the sector directional antenna and received with the omni-directional antenna is 13 dB, the SNR in the case where a test signal is transmitted and received with the beam directivity is 40 dB. In this way, from the reception result that the test signal is transmitted with the sector directivity and received with the omni-directivity, the result in the case where a test signal is transmitted and received with the beam directivity is estimated. Thus, a test signal is not transmitted or received with an antenna setting of which communication quality does not meet used specifications with beam directivity, so the number of times a test signal is transmitted can be reduced.

In S405, the wireless data transmitter 101 receives the feedback signal. In S407, the wireless data transmitter 101 transmits a test signal by using a beam that belongs to the sector directivity of which the reception quality of a test signal is higher than or equal to the threshold. The test signal describes the MAC address of the wireless data transmitter 101, the MAC address of the wireless data receiver 102, the remaining number of times a test signal is transmitted, the identification information of the sector directional antenna, and the identification information of the beam directivity. In S406, the wireless data receiver 102 sets the receiving antenna to the omni-directivity and receives the test signal. In S408, the wireless data receiver 102 generates a feedback signal describing the identification information of the sector directivity at the time of reception of which the reception quality is higher than or equal to the threshold among the received test signals, the identification information of the beam directivity, and a received signal power and transmits the feedback signal to the wireless data transmitter 101. The threshold that is used to evaluate the reception quality is determined based on the antenna gain of the omni-directivity, the antenna gain of the beam directivity, and an SNR used for a modulation scheme to be used in data communication.

In S409, the wireless data transmitter 101 receives the feedback signal. In S410, the wireless data transmitter 101 receives the feedback signal and determines the beam directivities to be used as the main path and the auxiliary path. The beam directivity of which the reception result is the best and the beam directivity of which the reception result is the second best among the feedback signals are respectively selected as the main path and the auxiliary path; however, two beams are selected respectively from among sets of directivities that belong to different sector directivities. By selecting beams that belong to different sector directivities, the main path and the auxiliary path can be spatially discrete. In the present embodiment, only one auxiliary path is selected; however, two or more auxiliary paths may be selected.

In S411, the wireless data transmitter 101 transmits a test signal via the main path. The number of times transmitted is a sufficient number of times the wireless data receiver 102 determines the best beam directivity for the main path, and the sum of the number of sector directivities of the wireless data receiver 102 and the number of beams in each sector directivity is a minimum number of times. In S412, the wireless data receiver 102 receives a test signal while switching the sector directivity and the beam directivity and determines the beam directivity to be used as the main path. In S413, the wireless data transmitter 101 transmits a test signal via the auxiliary path. The number of times transmitted is a sufficient number of times the wireless data receiver 102 determines the best beam directivity for the auxiliary path, and the sum of the number of sector directivities of the wireless data receiver 102 and the number of beams in each sector directivity is a minimum number of times. After the wireless data transmitter 101 completes transmission of test signals in S413, the wireless data transmitter 101 ends the path search procedure. In S414, the wireless data receiver 102 receives a test signal while switching the sector directivity and the beam directivity and determines the beam directivity to be used as the auxiliary path. After the wireless data receiver 102 determines the beam to be used as the auxiliary path in S414, the wireless data receiver 102 ends the path search procedure.

Next, the procedure of performing wireless communication will be described. The wireless data transmitter 101 broadcasts a beacon signal describing information that designates a period during which the wireless data transmitter 101 has a transmission right and the wireless data receiver 102 becomes a receiving station. When the designated period has come, the wireless data receiver 102 sets the beam directivity of which the antenna directivity is directed toward the main path and performs an operation to receive a data signal. When the designated period has come, the wireless data transmitter 101 sets the beam directivity of which the antenna directivity is directed toward the main path and transmits a data signal. The wireless data transmitter 101 that has completed transmission of the data signal changes the antenna directivity to the omni-directivity and performs an operation to receive an ACK frame for a predetermined period. The wireless data receiver 102 that has normally received the data signal transmits an ACK frame via the main path. When the wireless data receiver 102 has not received wireless data in an expected period or the wireless data transmitter 101 has not received an ACK frame in an expected period, the wireless data receiver 102 or the wireless data transmitter 101 transmits a switch request signal via the auxiliary path. When the transmitter or the receiver normally receives the switch request signal, the transmitter or the receiver transmits a switch acknowledgement signal via the auxiliary path. When the wireless data transmitter 101 has not received a switch acknowledgement signal for a predetermined period after transmitting the switch request signal, the wireless data transmitter 101 transmits a path search activation signal with the omni-directivity. When the wireless data receiver 102 has not received a switch acknowledgement signal for a predetermined period after transmitting the switch request signal, the wireless data receiver 102 maintains the operation to receive a path search activation signal with the omni-directivity. When the wireless data receiver 102 receives a path search activation signal, the wireless data receiver 102 transmits a path search acknowledgement signal. The wireless data transmitter 101 that has received the path search acknowledgement signal and the wireless data receiver 102 that has transmitted the path search acknowledgement signal execute the path search procedure shown in FIG. 4 together and search for a new main path and a new auxiliary path.

Figure 5:
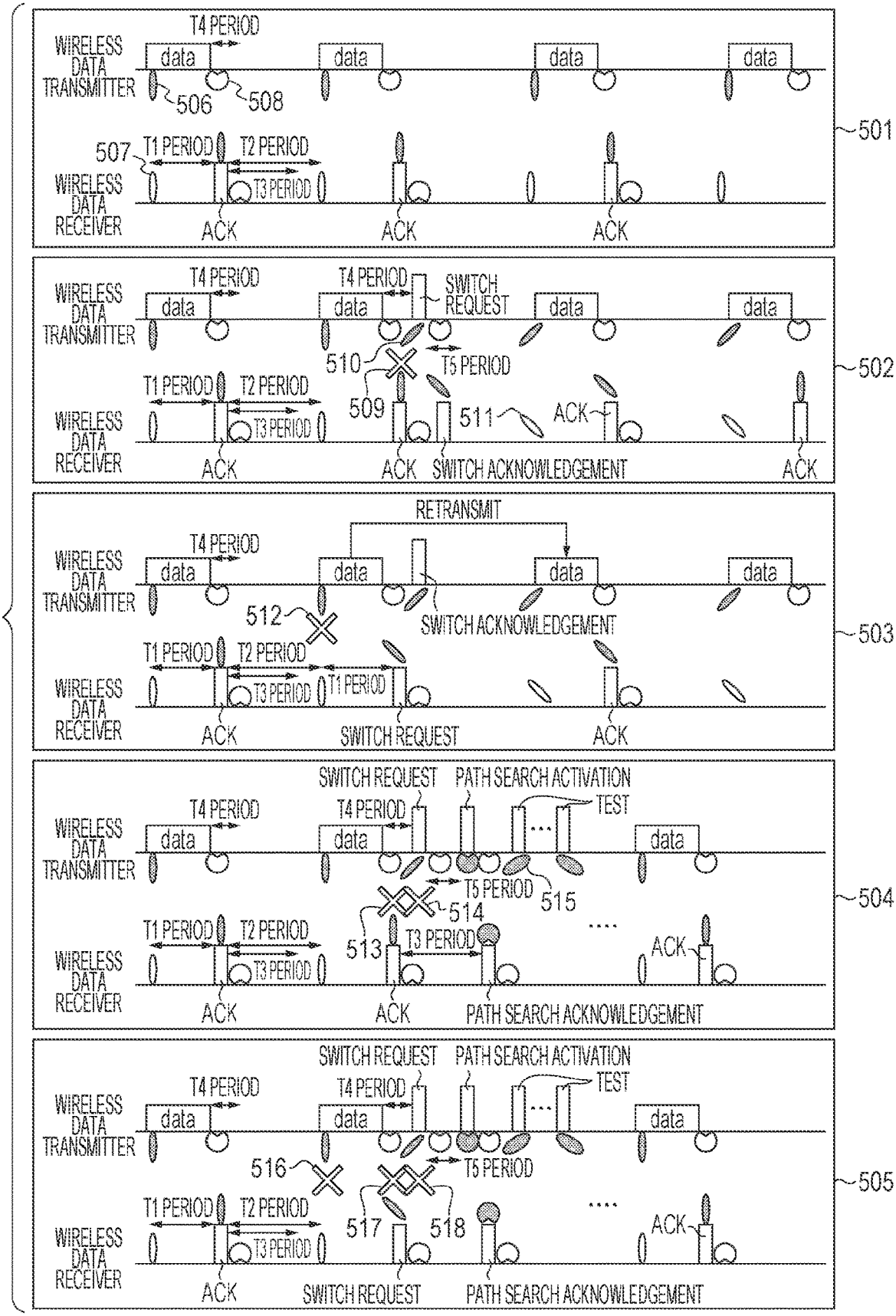
FIG. 5 is a view that shows a path interruption occurrence situation and a path switching procedure according to the first embodiment of the present invention.

The above-described process will be described in detail with reference to FIG. 5. FIG. 5 is a view that shows situations in which path interruption has occurred and associated path switching procedures. Situation 501 represents a situation in which no communication interruption is occurring in the main path. The wireless data transmitter 101 forms a beam 506 in the main path and transmits a data signal. The wireless data receiver 102 forms a beam 507 in the main path and receives the data signal. The wireless data transmitter 101 forms an omni-directivity 508 during a predetermined period (T4 period) after transmitting data and performs an operation to receive an ACK frame. The wireless data receiver 102 forms an omni-directivity after transmitting an ACK frame and performs an operation to receive a wireless signal during a predetermined period (T3 period). When the wireless data receiver 102 has not received any frame during the predetermined period (T3 period), the wireless data receiver 102 suspends the receiving operation during a remaining period (T2 period-T3 period) and suppresses an electric power consumption.

Situation 502 represents a situation in which communication interruption has been occurring in the main path from when an ACK frame is communicated. The wireless data transmitter 101 forms an omni-directivity after transmitting a data frame and starts a receiving operation. After that, path interruption 509 occurs, and the wireless data transmitter 101 that has not received an ACK frame in a predetermined period (T4 period) forms a beam directivity 510 in the auxiliary path and transmits a switch request signal. The wireless data receiver 102 that has received the switch request signal with the omni-directivity forms a beam in the auxiliary path and transmits a switch acknowledgement signal. The wireless data transmitter 101 that has received the switch acknowledgement signal with the omni-directivity forms a beam in the auxiliary path and transmits a data signal. The wireless data receiver 102 that has transmitted the switch acknowledgement signal via the auxiliary path forms a beam 511 in the auxiliary path and receives the data signal.

Situation 503 represents a situation in which communication interruption occurs in the main path when a data frame is communicated. Since the wireless data receiver 102 has not received wireless data in a predetermined period (T1 period) because of path interruption 512, the wireless data receiver 102 forms a beam in the auxiliary path and transmits a switch request signal. The wireless data transmitter 101 receives the switch request signal with the omni-directivity and then transmits a switch acknowledgement signal via the auxiliary path. Furthermore, the wireless data transmitter 101 transmits retransmission data in the next data transmission period, so the wireless data receiver 102 is able to normally receive wireless data that has not been normally received in the last data communication period.

Situation 504 represents a situation in which communication interruption occurs in both the main path and the auxiliary path when an ACK frame is communicated. The wireless data transmitter 101 forms a beam in the main path and transmits a data signal. Since the wireless data receiver 102 has normally received the data signal, the wireless data receiver 102 transmits an ACK frame; however, path interruption has been occurring from when the ACK frame is communicated, so the wireless data transmitter 101 is not able to receive the ACK frame in a predetermined period (T4 period) because of path interruption 513. The wireless data transmitter 101 that has not received an ACK frame forms a beam in the auxiliary path and transmits a switch request signal; however, communication interruption is also occurring in the auxiliary path, so the wireless data receiver 102 is not able to receive the switch request signal because of path interruption 514. The wireless data receiver 102 that has not received a switch request signal is not able to transmit a switch acknowledgement signal and continues a receiving operation until a predetermined period (T3 period) elapses. When the wireless data transmitter 101 has not received a switch acknowledgement signal for a predetermined period (T5 period) after transmitting the switch request signal, the wireless data transmitter 101 is able to detect that communication interruption is occurring in both the main path and the auxiliary path and transmits a path search activation signal with the omni-directivity. The wireless data receiver 102 is able to receive the path search activation signal with the omni-directivity in the predetermined period (T3 period), so the wireless data receiver 102 transmits a path search acknowledgement signal with the omni-directivity. After that, the wireless data transmitter 101 transmits a test signal while switching a sector directivity 515 and searches for a new main path and a new auxiliary path. As soon as a path search is complete, the wireless data transmitter 101 and the wireless data receiver 102 perform wireless data communication by using a new main path.

Situation 505 represents a situation in which path interruption has been occurring in both the main path and the auxiliary path from when a data frame is communicated. The wireless data transmitter 101 forms a beam in the main path and transmits a data signal; however, path interruption has been occurring from when a data frame is communicated, so the wireless data receiver 102 is not able to receive a data frame in a predetermined period (T1 period) because of path interruption 516. The wireless data receiver 102 that has not received a data frame forms a beam in the auxiliary path and transmits a switch request signal; however, path interruption is also occurring in the auxiliary path, so the wireless data transmitter 101 is not able to receive a switch request signal because of path interruption 517. Since the wireless data transmitter 101 has not received an ACK frame or a switch request signal within a predetermined period (T4 period) after transmitting the data signal, the wireless data transmitter 101 forms a beam in the auxiliary path and transmits a switch request signal. However, the wireless data receiver 102 is not able to receive a switch request signal because of path interruption 518 and is not able to transmit a switch acknowledgement signal. When the wireless data transmitter 101 has not received a switch acknowledgement signal for a predetermined period (T5 period) after transmitting the switch request signal, the wireless data transmitter 101 is able to detect that communication interruption is occurring in both the main path and the auxiliary path and transmits a path search activation signal with the omni-directivity. The operations after transmission of the path search activation signal are the same as those of Situation 504, so the description thereof is omitted.

These are communication procedures that the wireless data transmitter 101 and the wireless data receiver 102 perform wireless communication and wireless signals used for communication. Thus, even when path interruption occurs in any one or both of the main path and the auxiliary path at any one of the timing of data signal communication and ACK frame communication, both the wireless data transmitter and receiver are able to detect the timing of occurrence of path interruption within a predetermined period (T3 period).

The functional components of the wireless data transmitter 101 will be described in detail with reference to FIG. 2. The wireless I/F unit 201 of the wireless data transmitter 101 acquires a data signal output by a data signal transmitting unit 202 and transmits the data signal to the wireless data receiver 102. When the data signal is not normally received by the wireless data receiver 102, the data signal needs to be retransmitted, so the wireless data transmitter 101 holds the data signal until the wireless data transmitter 101 receives an ACK frame within the predetermined period or until the wireless data transmitter 101 activates a new path search. When the wireless I/F unit 201 of the wireless data transmitter 101 receives an ACK frame, the wireless I/F unit 201 outputs the ACK frame to an ACK frame receiving unit 203.

The wireless I/F unit 201 also acquires an evaluation result indicating whether data communication has been appropriately completed via the main path from the ACK frame receiving unit 203. When the evaluation result indicates that data communication has completed via the main path, the wireless I/F unit 201 discards the data signal held for retransmission. When the wireless I/F unit 201 of the wireless data transmitter 101 has not received an ACK frame from the wireless data receiver 102 within a predetermined period after transmitting data, the wireless I/F unit 201 outputs a command to generate a switch request signal to the switch request signal generation unit 204. The wireless I/F unit 201 acquires a switch request signal from the switch request signal generation unit 204, forms a beam toward the auxiliary path, and transmits the switch request signal. After the wireless I/F unit 201 completes transmission of the switch request signal, the wireless I/F unit 201 sets the receiving antenna to the omni-directivity and performs an operation to receive a switch acknowledgement signal for a predetermined period. When the wireless I/F unit 201 of the wireless data transmitter 101 receives a switch request signal from the wireless data receiver 102, the wireless I/F unit 201 outputs a command to generate a switch acknowledgement signal to the switch acknowledgement signal generation unit 205. The wireless I/F unit 201 acquires a switch acknowledgement signal from the switch acknowledgement signal generation unit 205, forms a beam toward the auxiliary path, and transmits the switch acknowledgement signal. After the wireless I/F unit 201 completes transmission of the switch acknowledgement signal, the wireless I/F unit 201 forms a beam in the auxiliary path as a main path and performs an operation to transmit a data signal from the next data transmission period. When the wireless I/F unit 201 of the wireless data transmitter 101 has not received a switch acknowledgement signal for the switch request signal for a predetermined period, the wireless I/F unit 201 outputs a command to generate a path search activation signal and outputs the path search activation signal to a path search activation signal generation unit 206. The wireless I/F unit 201 acquires a path search activation signal from the path search activation signal generation unit 206, sets the transmitting antenna to the omni-directivity, and transmits the path search activation signal. After the wireless I/F unit 201 completes transmission of the path search activation signal, the wireless I/F unit 201 sets the receiving antenna to the omni-directivity, receives a path search acknowledgement signal from the wireless data receiver 102, and activates a path search. At the timing at which the wireless I/F unit 201 acquires the path search activation signal, the wireless I/F unit 201 discards the data held for retransmission.

The data signal transmitting unit 202 of the wireless data transmitter 101 includes an image capturing apparatus, such as a video camcorder, and a signal processing circuit made up of a DSP, or the like, that performs image processing, and outputs captured image data to the wireless I/F unit 201 with an attached error detection code, such as CRC.

The ACK frame receiving unit 203 of the wireless data transmitter 101 acquires an ACK frame from the wireless I/F unit 201. The ACK frame receiving unit 203 determines whether a data frame has been received via the main path within a predetermined period based on the ACK frame and outputs a determined result to the wireless I/F unit 201.

When the switch request signal generation unit 204 of the wireless data transmitter 101 acquires a command to generate a switch request signal from the wireless I/F unit 201, the switch request signal generation unit 204 generates a switch request signal and outputs the switch request signal to the wireless I/F unit 201.

When the switch acknowledgement signal generation unit 205 of the wireless data transmitter 101 acquires a command to generate a switch acknowledgement signal from the wireless I/F unit 201, the switch acknowledgement signal generation unit 205 generates a switch acknowledgement signal and outputs the switch acknowledgement signal to the wireless I/F unit 201.

When the path search activation signal generation unit 206 of the wireless data transmitter 101 acquires a command to generate a path search activation signal from the wireless I/F unit 201, the path search activation signal generation unit 206 generates a path search activation signal and outputs the path search activation signal to the wireless I/F unit 201.

Figure 3:
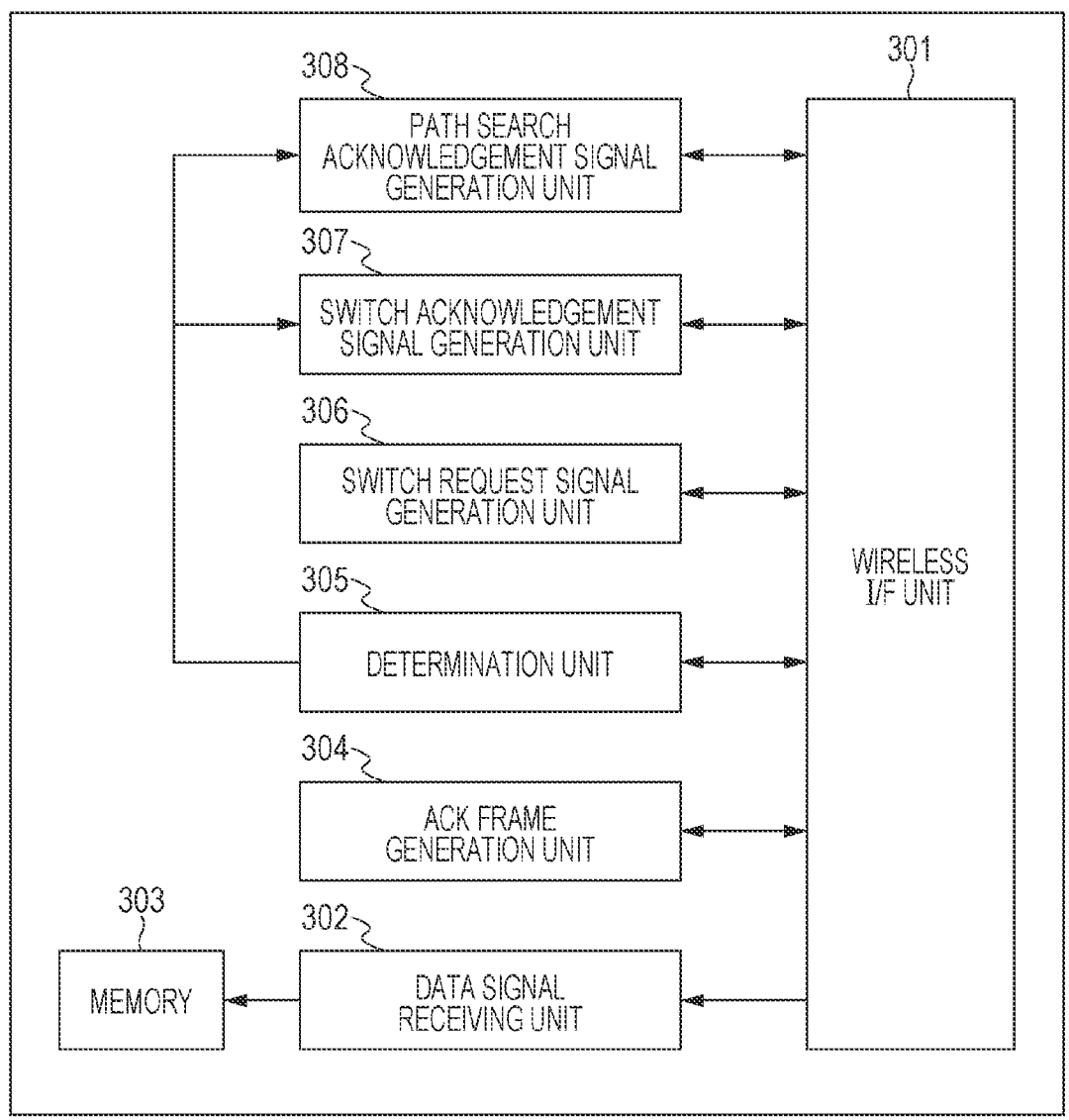
FIG. 3 is a configuration diagram of a wireless data receiver according to the first embodiment of the present invention.

Hereinafter, the wireless data receiver 102 will be described. FIG. 3 is a diagram that shows the functional configuration of the wireless data receiver 102.

A wireless I/F unit 301 of the wireless data receiver 102 includes an array antenna capable of forming the omni-directivity and the beam directivity in a selected direction. The wireless I/F unit 301 includes an analog-to-digital converter that converts a received analog signal to a digital signal. The wireless I/F unit 301 includes a digital-to-analog signal converter that converts a digital signal generated by each of an ACK frame generation unit 304 and a switch request signal generation unit 306 to an analog signal. Furthermore, the wireless I/F unit 301 includes a wireless signal processing circuit that generates and acquires a wireless signal that is used to perform wireless communication with the wireless data transmitter 101.

The wireless I/F unit 301 of the wireless data receiver 102 outputs a wireless data signal received from the wireless data transmitter 101 to a data signal receiving unit 302. The wireless I/F unit 301 of the wireless data receiver 102 outputs the reception quality of the wireless data signal to the ACK frame generation unit 304. The wireless I/F unit 301 acquires an ACK frame generated by the ACK frame generation unit 304 and transmits the ACK frame to the wireless data transmitter 101. When the wireless I/F unit 301 receives an ACK frame, the wireless I/F unit 301 outputs time information about the time at which transmission of the ACK frame is completed, time information about the time at which reception of a switch request signal or path search signal occurs after transmission of the ACK frame, and a wireless signal received at that time. When the wireless I/F unit 301 acquires a determined result on the path condition of the main path, generated by a determination unit 305, and acquires the determined result that "no path interruption is occurring in the main path", the wireless I/F unit 301 forms a beam toward the same main path and performs an operation to receive a data signal from the next data reception period as well. When the wireless I/F unit 301 of the wireless data receiver 102 does not receive a data signal from the wireless data transmitter 101 at the time at which data reception occurs, the wireless I/F unit 301 outputs a command to generate a switch request signal to the switch request signal generation unit 306. The wireless I/F unit 301 acquires a switch request signal generated by the switch request signal generation unit 306, forms a beam toward the auxiliary path, and transmits the switch request signal. After the wireless I/F unit 301 completes transmission of the switch request signal, the wireless I/F unit 301 sets the receiving antenna to the omni-directivity and performs an operation to receive a switch acknowledgement signal or path search activation signal for a predetermined period.

When the wireless I/F unit 301 receives a switch acknowledgement signal, the wireless I/F unit 301 forms a beam and performs an operation to receive a data signal via the auxiliary path as a main path from the next data reception period. The wireless I/F unit 301 of the wireless data receiver 102 outputs the received switch request signal to a switch acknowledgement signal generation unit 307. The wireless I/F unit 301 acquires a switch acknowledgement signal generated by the switch acknowledgement signal generation unit 307, forms a beam toward the auxiliary path, and transmits the switch acknowledgement signal. After the wireless I/F unit 301 completes transmission of the switch acknowledgement signal, the wireless I/F unit 301 forms a beam and performs an operation to receive a data signal via the auxiliary path as a main path from the next data reception period. The wireless I/F unit 301 of the wireless data receiver 102 outputs a received path search activation signal to a path search acknowledgement signal generation unit 308. The wireless I/F unit 301 acquires a path search acknowledgement signal generated by the path search acknowledgement signal generation unit 308, sets the transmitting antenna to the omni-directivity, and transmits the path search acknowledgement signal. After the wireless I/F unit 301 completes transmission of the path search acknowledgement signal, the wireless I/F unit 301 sets the receiving antenna to the omni-directivity and performs an operation to receive a test signal and an operation to transmit an acknowledgement signal for path search while switching the antenna directivity.

The data signal receiving unit 302 of the wireless data receiver 102 acquires a wireless data signal output from the wireless I/F unit 301 and outputs the wireless data signal to a memory 303.

The memory 303 of the wireless data receiver 102 acquires the wireless data signal output by the data signal receiving unit 302 and stores the wireless data signal in a storage device. The storage device just needs to have a sufficient capacity that an acquired data signal can be saved. When the transmission amount of data signals is large for the capacity of the storage device, the capacity of data signals may be, for example, reduced by, for example, compressing data signals.

The ACK frame generation unit 304 acquires the reception quality of a wireless data signal output from the wireless I/F unit 301, generates an ACK frame when determining that the received wireless data has no error, and outputs the ACK frame to the wireless I/F unit 301.

The determination unit 305 of the wireless data receiver 102, when the wireless I/F unit 301 transmits an ACK frame, acquires time information about the time at which transmission of the ACK frame has been completed and time information about the time at which reception of a switch request signal or path search signal occurs after transmission of the ACK frame. The determination unit 305 acquires a wireless signal received at the time at which reception of a switch request signal or path search signal occurs after transmission of the ACK frame. When the determination unit 305 has not acquired any wireless signal at that time, the determination unit 305 outputs a determined result "no path interruption is occurring in the main path" to the wireless I/F unit 301. When a switch request signal is received at that time, the determination unit 305 determines that "path interruption has occurred in the main path but the auxiliary path is alive" and outputs a command to generate a switch acknowledgement signal to the switch acknowledgement signal generation unit 307. When a path search activation signal is received at that time, the determination unit 305 determines that "path interruption has occurred in both the main path and the auxiliary path" and outputs a command to generate a path search acknowledgement signal to the path search acknowledgement signal generation unit 308.

When the switch request signal generation unit 306 of the wireless data receiver 102 acquires a command to generate a switch request signal from the wireless I/F unit 301, the switch request signal generation unit 306 generates a switch request signal and outputs the switch request signal to the wireless I/F unit 301.

When the switch acknowledgement signal generation unit 307 of the wireless data receiver 102 acquires a command to generate a switch acknowledgement signal, generated by the wireless I/F unit 301 or the determination unit 305, the switch acknowledgement signal generation unit 307 generates a switch acknowledgement signal and outputs the switch acknowledgement signal to the wireless I/F unit 301.

When the path search acknowledgement signal generation unit 308 of the wireless data receiver 102 acquires a command to generate a path search acknowledgement signal, generated by the wireless I/F unit 301 or the determination unit 305, the path search acknowledgement signal generation unit 308 generates a path search acknowledgement signal and outputs the path search acknowledgement signal to the wireless I/F unit 301.

Figure 6:
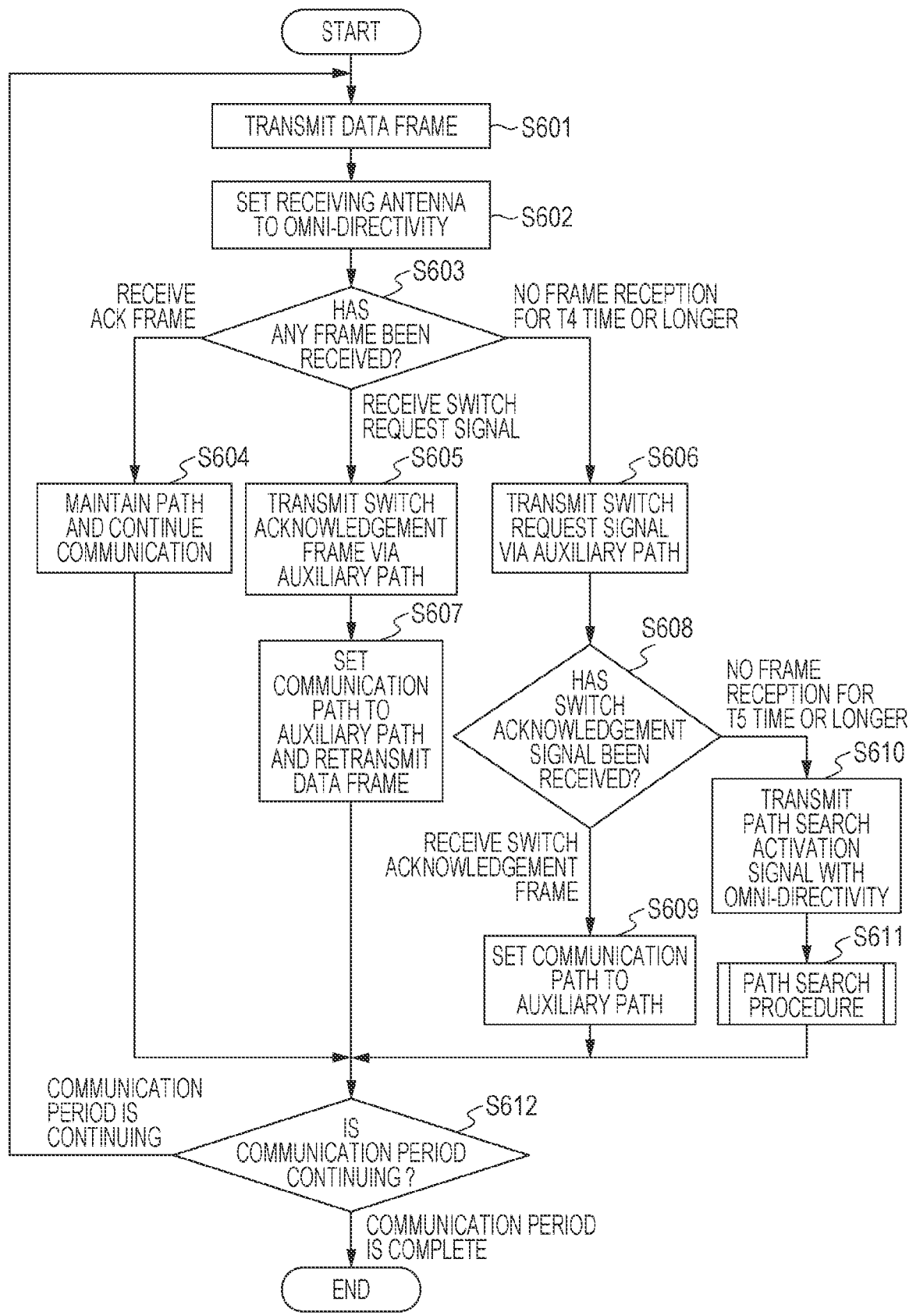
FIG. 6 is a chart that illustrates operations of the wireless data transmitter according to the first embodiment of the present invention.
Figure 7:
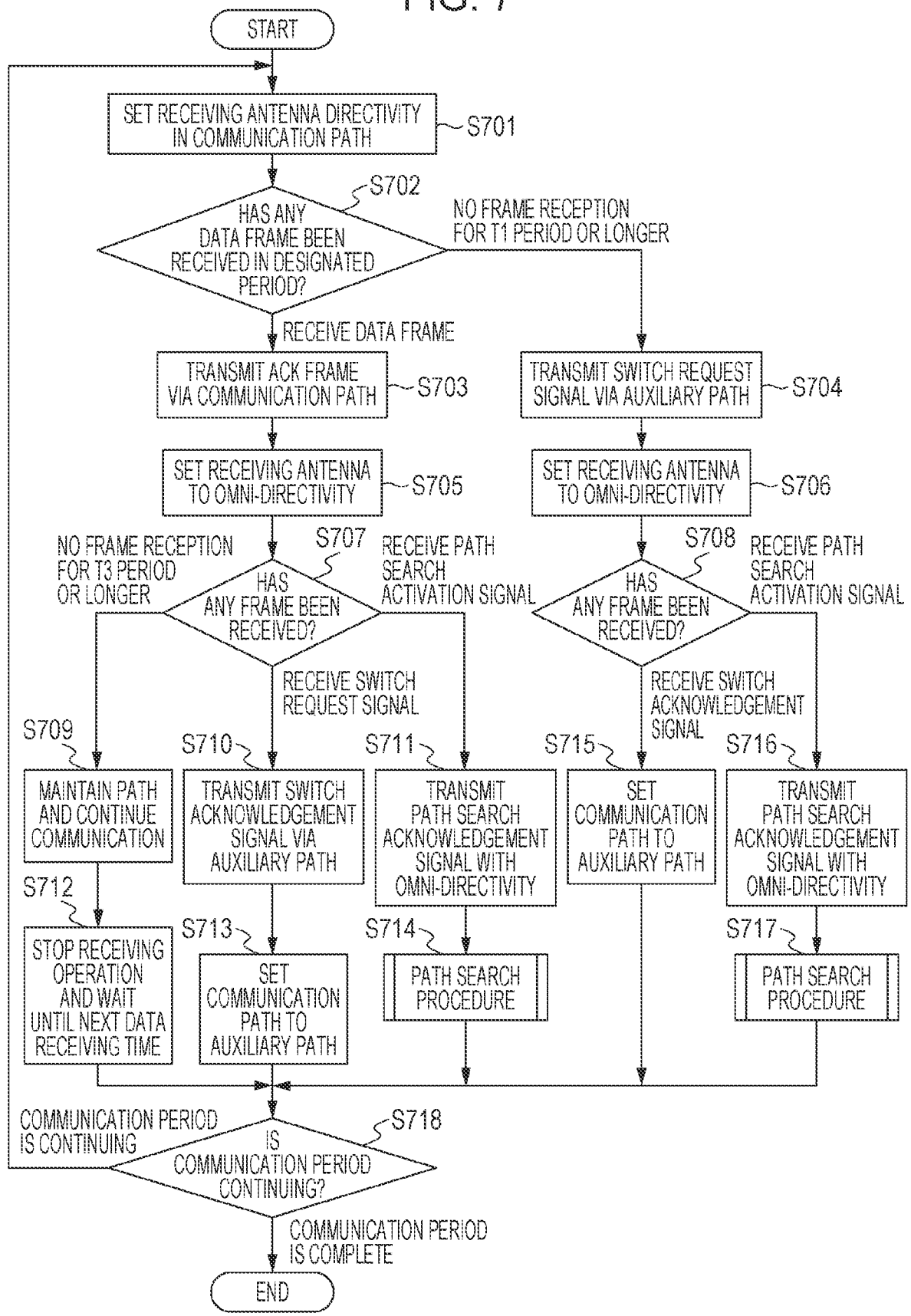
FIG. 7 is a chart that illustrates operations of the wireless data receiver according to the first embodiment of the present invention.

Next, the operations of the wireless data transmitter and wireless data receiver of the present embodiment will be described with reference to the flowcharts of FIG. 6 and FIG. 7. FIG. 6 is a flowchart of a process that is executed in the wireless data transmitter 101. FIG. 7 is a flowchart of a process that is executed in the wireless data receiver 102.

In S601, the wireless data transmitter 101 transmits a data frame via the main path. In S602, the wireless data transmitter 101 sets the directivity of the receiving antenna to the omni-directivity. When the wireless data receiver 102 has normally received the data frame, the wireless data receiver 102 transmits an ACK frame via the main path; whereas, when the wireless data receiver 102 has not normally received the data frame, the wireless data receiver 102 transmits a switch request signal via the auxiliary path. When the wireless data transmitter 101 sets the receiving antenna to the omni-directivity, the wireless data transmitter 101 is able to receive both an ACK frame and a switch request signal.

In S701, the wireless data receiver 102 forms a beam toward the main path to receive a data frame via the main path. In S702, the wireless data receiver 102 determines whether a data frame has been received in a predetermined period (T1 period). When the wireless data receiver 102 has received a data frame within the predetermined period (T1 period), the wireless data receiver 102 proceeds to S703; whereas, when the wireless data receiver 102 has not received a data frame within the predetermined period (T1 period), the wireless data receiver 102 proceeds to S704.

In S703, the wireless data receiver 102 transmits an ACK frame via the main path that is a communication path. In S705, the wireless data receiver 102 sets the receiving antenna to the omni-directivity. When the wireless data receiver 102 sets the receiving antenna to the omni-directivity, the wireless data receiver 102 is able to receive any one of a switch request signal that the wireless data transmitter 101 transmits via the auxiliary path and a path search activation signal that the wireless data transmitter 101 transmits with the omni-directivity.

In S704, the wireless data receiver 102 transmits a switch request signal by using the auxiliary path. The fact that the wireless data receiver 102 has not received a data frame within the predetermined period (T1 period) in S702 means that communication interruption is occurring in the main path, so the wireless data receiver 102 suspends the use of the main path and transmits a switch request frame by using the auxiliary path to use the auxiliary path.

In S706, the wireless data receiver 102 sets the receiving antenna to the omni-directivity. When the wireless data receiver 102 sets the receiving antenna to the omni-directivity, the wireless data receiver 102 is able to receive any one of a switch acknowledgement signal that the wireless data transmitter 101 transmits via the auxiliary path and a path search activation signal that the wireless data transmitter 101 transmits with the omni-directivity.

In S603, the wireless data transmitter 101 determines whether reception of a frame has occurred in a predetermined period (T4 period). A frame that can be received in this period (T4 period) is any one of an ACK frame that the wireless data receiver 102 transmits when the wireless data receiver 102 has normally received data and a switch request signal that the wireless data receiver 102 transmits when the wireless data receiver 102 has not normally received data. When the wireless data transmitter 101 receives an ACK frame, the wireless data transmitter 101 proceeds to S604. When the wireless data transmitter 101 receives a switch request signal, the wireless data transmitter 101 proceeds to S605. When the wireless data transmitter 101 has not received any frame in the predetermined period (T4 period), the wireless data transmitter 101 proceed to S606.

In S604, the wireless data transmitter 101 sets the antenna so as to maintain the path and continue communication. The fact that the wireless data transmitter 101 receives an ACK frame in the predetermined period (T4 period) in S603 means that no path interruption is occurring in the main path. In S605, the wireless data transmitter 101 transmits a switch acknowledgement frame by using the auxiliary path. The fact that the wireless data transmitter 101 receives a switch request frame in the predetermined period (T4 period) in S603 means that path interruption has occurred in the main path when a data frame is communicated but no path interruption is occurring in the auxiliary path.

In S607, the wireless data transmitter 101 retransmits the data frame by using the auxiliary path. In S606, the wireless data transmitter 101 transmits a switch request frame by using the auxiliary path. The fact that no frame reception has occurred in the predetermined period (T4 period) in S603 is the case where "after the wireless data receiver 102 normally receives a data frame, the wireless data receiver 102 has transmitted an ACK frame, but path interruption has been occurring from the timing at which the wireless data receiver 102 transmits the ACK frame". Alternatively, this is the case where "the wireless data receiver 102 has not received a data frame and has transmitted a switch request signal via the auxiliary path, but path interruption has also occurred in the auxiliary path". The wireless data transmitter 101 transmits a switch request frame by using the auxiliary path to identify the portion and timing at which trouble has occurred.

In S608, the wireless data transmitter 101 determines whether reception of a switch acknowledgement signal has occurred in a predetermined period (T5 period). When the wireless data transmitter 101 receives a switch acknowledgement signal, the wireless data transmitter 101 proceeds to S609. When the wireless data transmitter 101 has not received a switch acknowledgement signal for the predetermined period (T5 period), the wireless data transmitter 101 proceeds to S610. In S609, the wireless data transmitter 101 sets the auxiliary path as a communication path. Since the wireless data transmitter 101 has received a switch acknowledgement signal, the wireless data transmitter 101 is able to detect that "path interruption is occurring in the main path but no path interruption is occurring in the auxiliary path". In the following data communication, the wireless data transmitter 101 sets the directivity of the antenna so as to perform data communication by using the auxiliary path. In S610, the wireless data transmitter 101 transmits a path search activation signal by using the omni-directivity. When the wireless data transmitter 101 has not received a switch acknowledgement signal for the predetermined period (T5 period) in S608, the wireless data transmitter 101 is able to detect that path interruption is occurring in both the main path and the auxiliary path.

In S611, the wireless data transmitter 101 executes the path search procedure together with the wireless data receiver 102. When the wireless data transmitter 101 completes the path search procedure and completes a search for a new main path and a new auxiliary path, the wireless data transmitter 101 proceeds to S612. In S612, the wireless data transmitter 101 determines whether a communication period is continuing. When the wireless data transmitter 101 has no data transmission because of the exit of the application, the wireless data transmitter 101 determines that the communication period is complete and ends the procedure. When the application has not exited, the wireless data transmitter 101 proceeds to S601. Before returning to S601, the wireless data transmitter 101 may activate the path search procedure at selected timing and search for new paths. By periodically searching for paths, even when a communication environment changes, good communication paths can be ensured. The presence or absence of the communication period and the presence or absence of execution of the path search procedure are described in a beacon frame and are provided to the wireless data receiver 102.

In S707, the wireless data receiver 102 determines whether frame reception has occurred in a predetermined period (T3 period). A frame that can be received in this period is any one of a switch request signal that the wireless data transmitter 101 transmits when the wireless data transmitter 101 has not received an ACK frame and a path search activation signal that the wireless data transmitter 101 transmits when the wireless data transmitter 101 has not received a switch acknowledgement signal. When the wireless data receiver 102 has not received any frame, the wireless data receiver 102 proceeds to S709. When the wireless data receiver 102 receives a switch request signal, the wireless data receiver 102 proceeds to S710. When the wireless data receiver 102 receives a path search activation signal, the wireless data receiver 102 proceeds to S711.

In S709, the wireless data receiver 102 sets the antenna so as to maintain the path and continue communication. The fact that the wireless data receiver 102 receives an ACK frame in the predetermined period (T3 period) in S707 means that no path interruption is occurring in the main path. When the wireless data receiver 102 completes the setting, the wireless data receiver 102 proceeds to S712.

In S712, the wireless data receiver 102 stops the receiving operation until the next data reception time and performs a standby operation. Within the period (T2 period) during which the wireless data receiver 102 does not perform data communication, the wireless data receiver 102 does not receive a signal except for the period (T3 period) during which the wireless data receiver 102 receives a signal at the time of occurrence of path interruption. For this reason, the wireless data receiving station is able to suspend the receiving operation of the wireless communication device in a period (T2 period-T3 period) until the next data communication starts, and decrease an electric power consumption. After a lapse of the period (T2 period-T3 period) until the next data communication period begins, the wireless data receiver 102 proceeds to S718.

In S710, the wireless data receiver 102 transmits a switch acknowledgement signal by using the auxiliary path. Since the wireless data receiver 102 has received a switch request signal in S707, the wireless data receiver 102 is able to detect that "path interruption has been occurring in the main path from when an ACK frame is communicated but no path interruption is occurring in the auxiliary path". After the wireless data receiver 102 transmits the switch acknowledgement signal for switching the communication path to the auxiliary path, the wireless data receiver 102 proceeds to S713. In S713, the wireless data receiver 102 sets the auxiliary path as a communication path. To perform wireless communication via the auxiliary path, the wireless data receiver 102 forms a beam toward the auxiliary path and performs a data communication operation during the subsequent wireless data communication period.

In S711, the wireless data receiver 102 transmits a path search acknowledgement signal with the omni-directivity. Since the wireless data receiver 102 has received a path search activation signal in S707, the wireless data receiver 102 is able to detect that "path interruption is occurring in both the main path and the auxiliary path". The wireless data receiver 102 transmits a path search acknowledgement signal with the omni-directivity to search for new paths together with the wireless data transmitter 101. In S714, the wireless data receiver 102 performs a path search together with the wireless data transmitter 101. When the wireless data receiver 102 completes the path search procedure and completes a search for a new main path and a new auxiliary path, the wireless data receiver 102 proceeds to S718.

In S708, the wireless data receiver 102 determines whether frame reception has occurred. A frame that can be received in this period is any one of a switch acknowledgement signal that the wireless data transmitter 101 transmits when the wireless data transmitter 101 has received a switch request signal and a path search activation signal that the wireless data transmitter 101 transmits when the wireless data transmitter 101 has not received a switch request signal. When the wireless data receiver 102 receives a switch acknowledgement signal, the wireless data receiver 102 proceeds to S715. When the wireless data receiver 102 receives a path search activation signal, the wireless data receiver 102 proceeds to S716.

In S715, the wireless data receiver 102 determines the auxiliary path as a communication path. Since the wireless data receiver 102 has received a switch acknowledgement signal in S708, the wireless data receiver 102 is able to detect that "path interruption has been occurring in the main path from when a data frame is communicated but no path interruption is occurring in the auxiliary path". To perform wireless communication via the auxiliary path, the wireless data receiver 102 forms a beam toward the auxiliary path and performs a data communication operation during the subsequent wireless data communication period. After the wireless data receiver 102 sets the auxiliary path as a communication path, the wireless data receiver 102 proceeds to S718.

In S716, the wireless data receiver 102 transmits a path search acknowledgement signal with the omni-directivity. Since the wireless data receiver 102 has received a path search activation signal in S708, the wireless data receiver 102 is able to detect that "path interruption has been occurring in both the main path and the auxiliary path from when a data frame is communicated". In S717, the wireless data receiver 102 performs a path search together with the wireless data transmitter 101. In S718, the wireless data receiver 102 determines whether the communication period is continuing based on the latest beacon frame transmitted by the wireless data transmitter 101. When the communication period is continuing, the wireless data receiver 102 proceeds to S701. When the communication period is complete, the wireless data receiver 102 ends the process.

As described above, according to the present embodiment, the wireless data transmitter and receiver are able to switch the communication path within a predetermined period according to the presence or absence of occurrence and details of communication path interruption between the wireless data transmitter and receiver, so path switching caused by communication path interruption can be achieved at high speed.

Second Embodiment

In the first embodiment, the wireless data transmitter and the wireless data receiver switch the main path to the auxiliary path when communication interruption occurs in the main path and searches for new paths when the main path and the auxiliary path are interrupted at the same time. To achieve these operations, after transmission of an ACK frame after reception of data, the wireless data transmitter and the wireless data receiver each set the directivity of the antenna to the omni-directivity and execute the operation to receive a frame notifying path interruption for a predetermined period. The wireless data transmitter and the wireless data receiver each select any one of continuously using the main path, switching to the auxiliary path, or searching for a new path based on the presence or absence of a frame received and the details of the frame.

In contrast to this, in the present embodiment, the wireless data transmitter and the wireless data receiver each execute the operation to receive a frame notifying path interruption after transmitting an ACK frame and select any one of a plurality of modes based on the frame size of a wireless data signal. The plurality of modes includes a mode in which the operation to switch the path based on the presence or absence and details of a received frame and a mode in which a wireless station autonomously switches the path when path interruption has occurred. When the frame size of a wireless data signal is large, a large amount of time is used for the error reception operation or retransmission process for the data frame. However, when the frame size is small, a time used for the error reception operation or retransmission process for the data frame is comparatively short. By changing the operation according to the frame size, when there occurs an error, a path can be switched without transmitting or receiving a frame providing an instruction to switch the path, and the path can be switched to the auxiliary path in a further short time when there occurs path interruption.

Hereinafter, the components and operations of the wireless data transmitter 101 and the wireless data receiver 102 according to the present embodiment will be described with reference to the accompanying drawings; however, like reference numerals denote blocks similar to the components and operations of the first embodiment in the drawings, and the description thereof is omitted.

Figure 8:
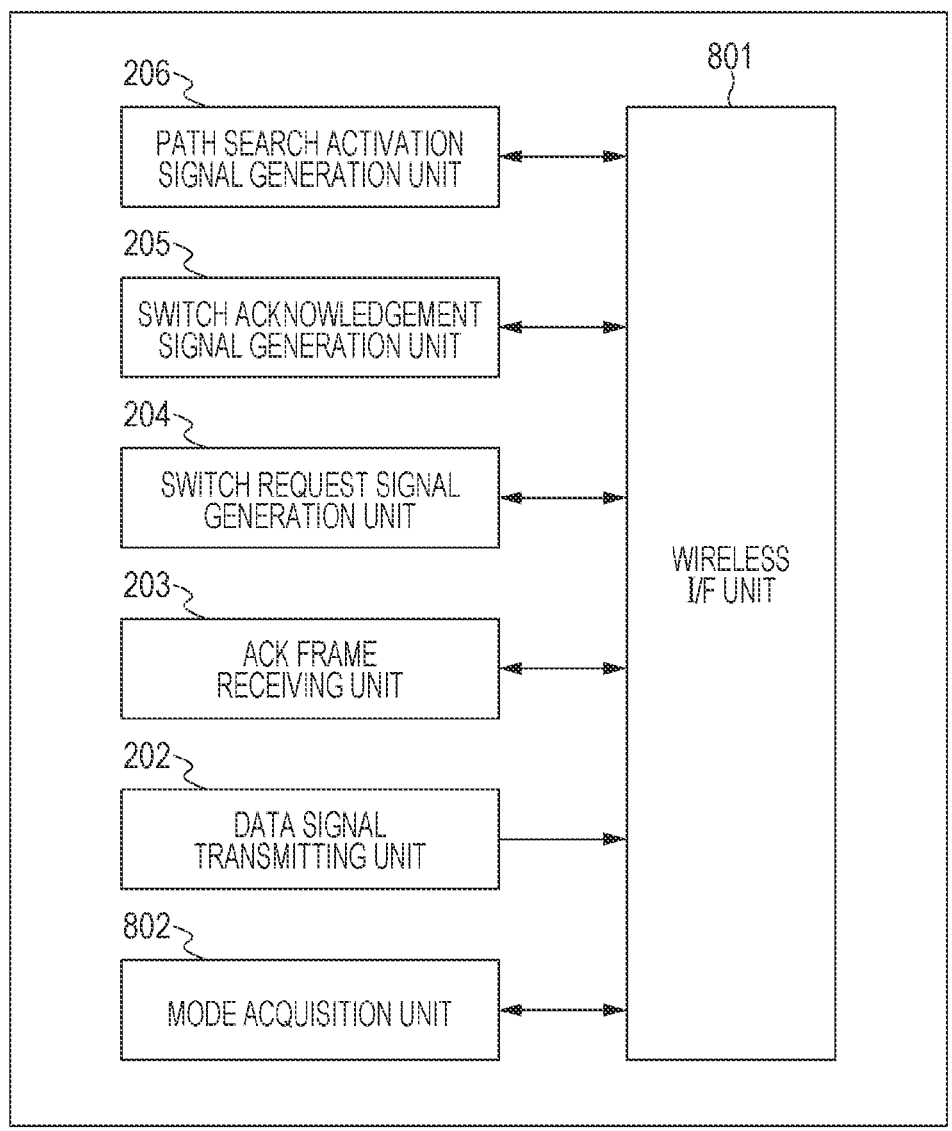
FIG. 8 is a configuration diagram of a wireless data transmitter according to a second embodiment of the present invention.

FIG. 8 is a diagram that shows a configuration example of the functional blocks of the wireless data transmitter 101 according to the present embodiment. In comparison with the first embodiment, a wireless I/F unit 801 of the wireless data transmitter 101 according to the present embodiment further receives a communication mode signal indicating a communication mode from the wireless data receiver 102. The wireless I/F unit 801 of the wireless data transmitter 101 outputs the communication mode signal to a mode acquisition unit 802 and acquires a communication mode instruction command from the mode acquisition unit 802.

When the communication mode is "Large" in which the frame size is larger than or equal to a threshold, conditions and types of signals that the wireless I/F unit 801 acquires from or outputs to the ACK frame receiving unit, the switch request signal generation unit, the switch acknowledgement signal generation unit, and the path search activation signal generation unit are the same. When the communication mode is "Small" in which the frame size is smaller than the threshold, the wireless I/F unit 801 does not acquire signals from or output commands to the switch request signal generation unit 204 and the switch acknowledgement signal generation unit 205. The wireless I/F unit 801 switches the communication path to the auxiliary path when the wireless I/F unit 801 has not received an ACK frame for a predetermined period and outputs a command to generate a path search activation signal to the path search activation signal generation unit 206 when the wireless I/F unit 801 has not received an ACK frame for another predetermined period. The wireless I/F unit 801 acquires a path search activation signal from the path search activation signal generation unit 206 and transmits the path search activation signal to the wireless data receiver 102 with the omni-directivity.

The mode acquisition unit 802 acquires a communication mode signal from the wireless I/F unit 801 and outputs a communication mode instruction command to the wireless I/F unit 801 based on details described in the communication mode signal. The operations related to the data signal transmitting unit 202 are the same as those of the first embodiment regardless of the communication mode.

Figure 9:
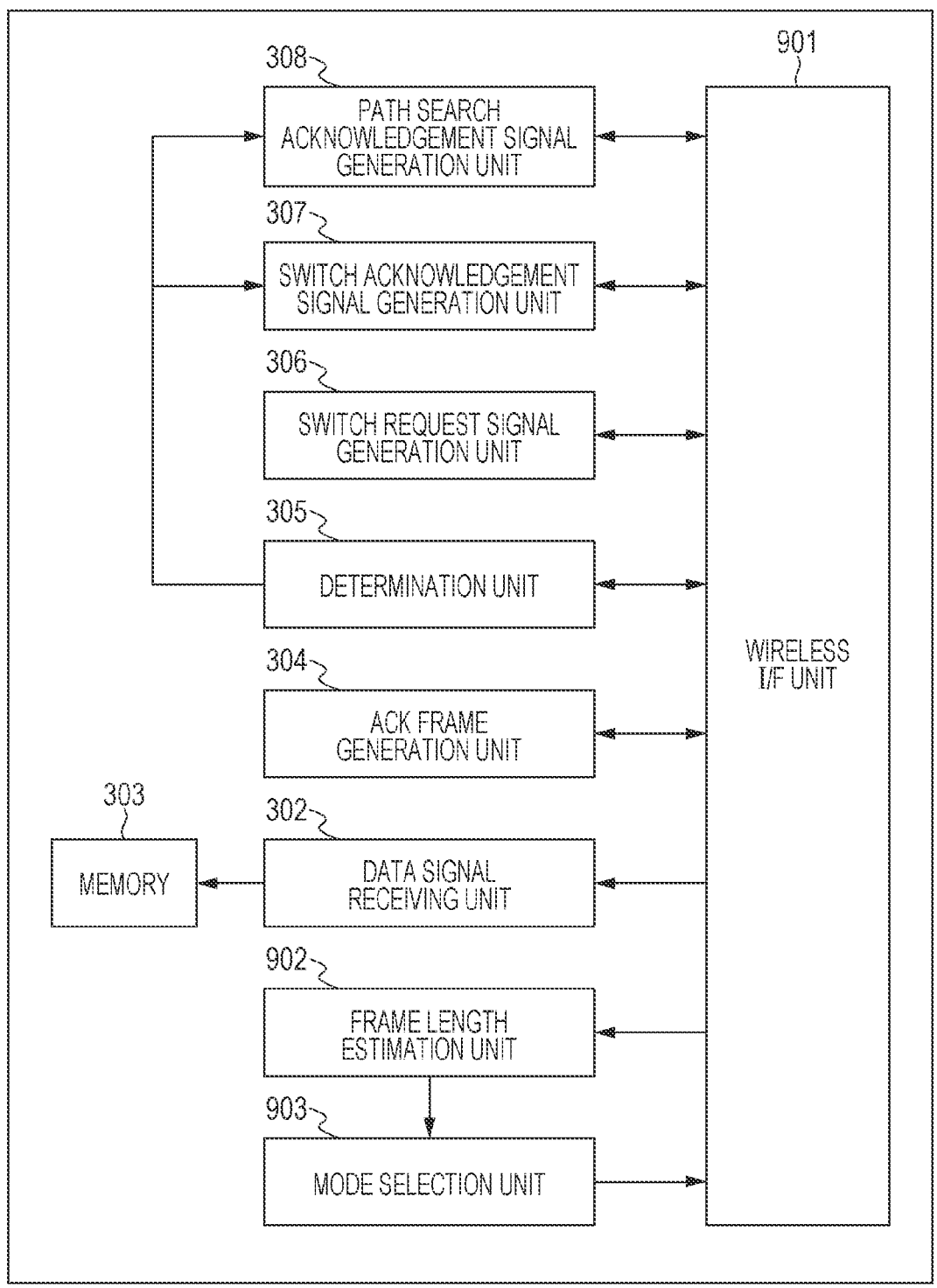
FIG. 9 is a configuration diagram of a wireless data receiver according to the second embodiment of the present invention.

FIG. 9 is a diagram that shows a configuration example of the functional blocks of the wireless data receiver 102 according to the present embodiment. In comparison with the first embodiment, a wireless I/F unit 901 of the wireless data receiver 102 according to the present embodiment further outputs a frame length of wireless data that the wireless data transmitter 101 transmits, to a frame length estimation unit 902. The wireless data receiver 102 further acquires a communication mode signal from a mode selection unit 903 and transmits the communication mode signal to the wireless data transmitter 101.

When the communication mode is "Large" in which the frame size is larger than or equal to the threshold, conditions and types of signals that the wireless I/F unit 901 acquires from or outputs to the ACK frame generation unit, the determination unit, the switch request signal generation unit, the switch acknowledgement signal generation unit, and the path search acknowledgement signal generation unit are the same. When the communication mode is "Small" in which the frame size is smaller than the threshold, the wireless I/F unit 901 does not acquire signals from or output commands to the determination unit 305, the switch request signal generation unit 306, and the switch acknowledgement signal generation unit 307. The wireless I/F unit 901 switches the communication path to the auxiliary path when the wireless I/F unit 901 has not received a data frame for a predetermined period and continues the operation to receive a path search request signal by setting the directivity of the receiving antenna to the omni-directivity when the wireless I/F unit 901 has not received a data frame for another predetermined period. When the wireless I/F unit 901 receives a path search request signal, the wireless I/F unit 901 outputs a command to generate a path search acknowledgement signal to the path search acknowledgement signal generation unit 308 and acquires a path search acknowledgement signal.

The frame length estimation unit 902 acquires the frame length of wireless data from the wireless I/F unit 901 and outputs a command describing the frame length to the mode selection unit 903. The mode selection unit 903 acquires a command describing the frame length from the frame length estimation unit 902 and determines the communication mode to any one of "Small" and "Large" based on a comparison with the threshold. The mode selection unit 903 outputs a communication mode signal describing the communication mode to the wireless I/F unit 901.

Figure 11:
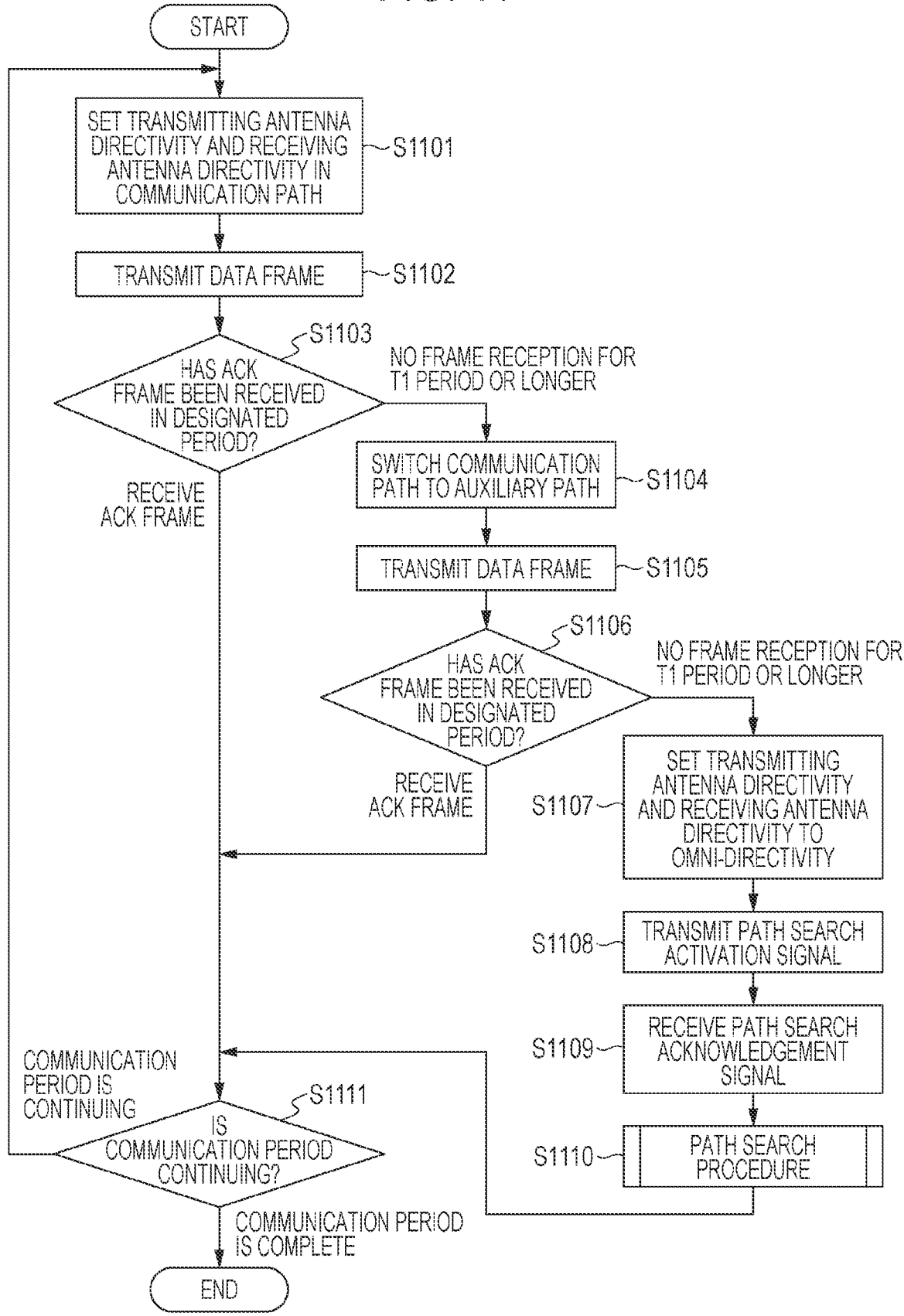
FIG. 11 is a chart that illustrates operations of the wireless data transmitter according to the second embodiment of the present invention.
Figure 12:
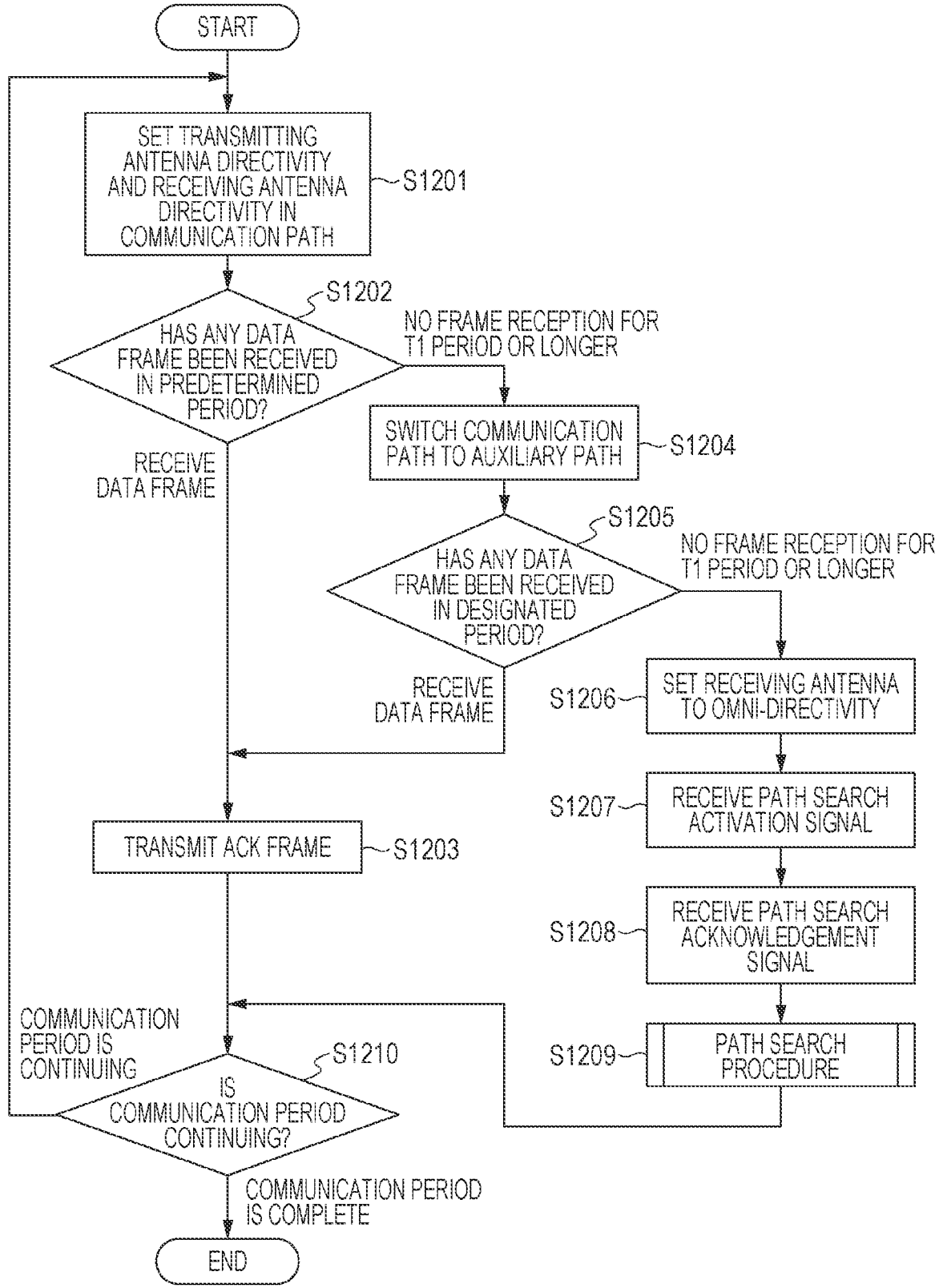
FIG. 12 is a chart that illustrates operations of the wireless data receiver according to the second embodiment of the present invention.

Next, a process that is executed in the wireless data transmitter and the wireless data receiver of the present embodiment will be described with reference to the flowcharts of FIG. 10, FIG. 11, and FIG. 12. In the present embodiment, description will be made on the assumption that the wireless data transmitter is a control station and the wireless data receiver is a slave; however, opposite roles may be assigned to the wireless data transmitter and the wireless data receiver.

Figure 10:
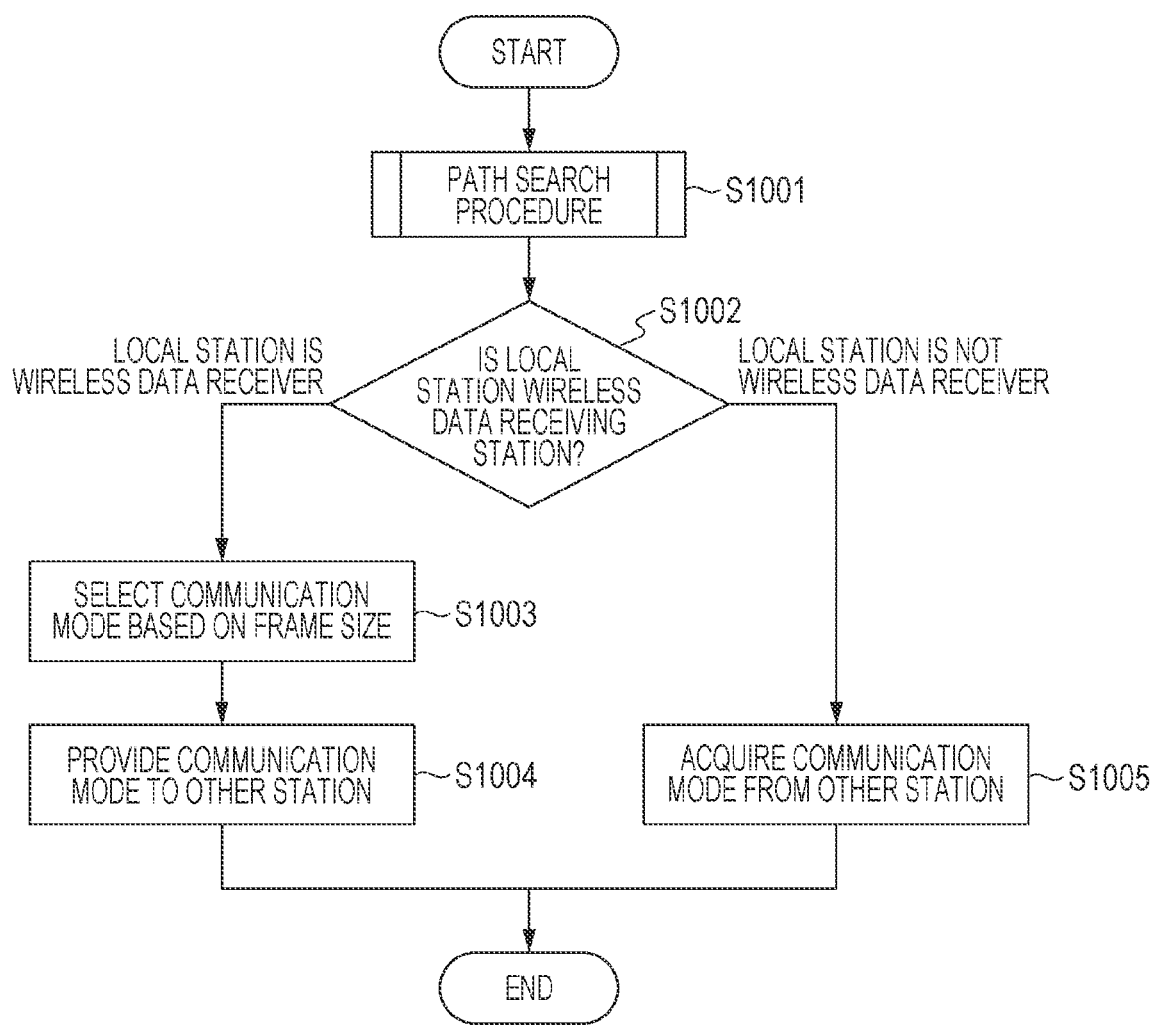
FIG. 10 is a view that shows a communication mode selection procedure according to the second embodiment of the present invention.

FIG. 10 shows a communication mode selection process that the wireless data transmitter 101 and the wireless data receiver 102 execute at the time of system startup. In S1001, the wireless data transmitter 101 and the wireless data receiver 102 execute a path search procedure and search for a main path and an auxiliary path. In S1002, the wireless data transmitter 101 determines whether the local station is a wireless data receiver, and determines that the local station is not a wireless data receiver. On the other hand, the wireless data receiver 102 determines in S1002 that the local station is a wireless data receiver.

In S1003, the wireless data receiver 102 selects the communication mode based on the communication quality of each of the main path and auxiliary path found in the path search procedure, and the frame size of application data that the wireless data transmitter 101 transmits. When the communication mode is "Large", the wireless data receiver 102 needs to perform frame reception by setting the directivity of the antenna to the omni-directivity for a predetermined period after transmission of an ACK frame. When the communication mode is "Small", the wireless data receiver 102 does not need to perform the receiving operation for the predetermined period after transmission of an ACK frame, but an unnecessary retransmission frame needs to occur when path interruption has occurred. When the period used for a retransmission process is shorter than the predetermined period after transmission of an ACK frame, the wireless data receiver 102 selects "Small" as the communication mode; otherwise, the wireless data receiver 102 selects "Large" as the communication mode. The predetermined period is a value obtained by adding a margin to a value of the sum of a period used for the wireless data transmitting station to detect an error of an ACK frame and a period used for the wireless data transmitting station to detect an error of a path search acknowledgement signal. Therefore, the predetermined period is determined according to a modulation scheme and frame interval that are used at the time when an ACK frame and a path search acknowledgement signal are transmitted and a period used for error detection. After the wireless data receiver 102 completes selection of the communication mode, the wireless data receiver 102 proceeds to S1004.

In S1004, the wireless data receiver 102 generates a wireless packet describing the communication mode and transmits the wireless packet to the wireless data transmitter 101. After the wireless data receiver 102 completes transmission, the wireless data receiver 102 ends the communication mode selection procedure. In S1005, the wireless data transmitter 101 receives the wireless packet describing the communication mode and acquires the communication mode, after which the wireless data transmitter 101 ends the communication mode selection procedure.

Next, the operations of the wireless data transmitter 101 and wireless data receiver 102 in the case where "Small" is selected as the communication mode according to the present embodiment will be described with reference to the flowcharts of FIG. 11 and FIG. 12. FIG. 11 is a flowchart of a process that is executed in the wireless data transmitter 101. FIG. 12 is a flowchart of a process that is executed in the wireless data receiver 102. The operations of the wireless data transmitter 101 and wireless data receiver 102 in the case where "Large" is selected as the communication mode are the same as those of the first embodiment.

In S1101, the wireless data transmitter 101 sets a directional transmission antenna and a directional receiving antenna in a communication path. After the wireless data transmitter 101 completes the setting of the antennas, the wireless data transmitter 101 proceeds to S1102. In S1102, the wireless data transmitter 101 transmits a data frame by using the main path.

In S1103, the wireless data transmitter 101 forms a beam toward the main path and performs the operation to receive an ACK frame. When the wireless data transmitter 101 receives a frame within a predetermined period (T1 period), the wireless data transmitter 101 proceeds to S1111. When the wireless data transmitter 101 has not received a frame, the wireless data transmitter 101 proceeds to S1104. The predetermined period (T1 period) is a sufficient time for the wireless data transmitter 101 to receive an ACK frame when the wireless data receiver 102 transmits an ACK frame after receiving a data frame.

In S1104, the wireless data transmitter 101 forms a beam toward the auxiliary path. The fact that the wireless data transmitter 101 has not received an ACK frame for the predetermined period (T1 period) in S1103 means that path interruption has occurred in the main path. When path interruption has occurred, the wireless data transmitter 101 switches the communication path from the main path to the auxiliary path and, after completion, proceeds to S1105. In S1105, the wireless data transmitter 101 transmits a data frame via the auxiliary path.

In S1106, the wireless data transmitter 101 forms a beam toward the auxiliary path and performs the operation to receive an ACK frame. When the wireless data transmitter 101 receives a frame within a predetermined period (T1 period), the wireless data transmitter 101 proceeds to S1111. When the wireless data transmitter 101 has not received a frame, the wireless data transmitter 101 proceeds to S1107. In S1107, the wireless data transmitter 101 sets the transmitting antenna directivity and the receiving antenna directivity to the omni-directivity. The fact that the wireless data transmitter 101 has not received an ACK frame in S1106 means that path interruption has occurred in both the main path and the auxiliary path, and the wireless data transmitter 101 needs to search for new paths.

In S1108, the wireless data transmitter 101 transmits a path search activation signal with the omni-directivity. In S1109, the wireless data transmitter 101 receives a path search acknowledgement signal with the omni-directivity. In S1110, the wireless data transmitter 101 performs a path search together with the wireless data receiver 102. In S1111, the wireless data transmitter 101 determines whether the communication period is continuing. When the wireless data transmitter 101 has no data transmission because of the exit of the application, the wireless data transmitter 101 determines that the communication period is complete and ends the procedure. When the application has not exited, the wireless data transmitter 101 proceeds to S1101. Before returning to S1101, the wireless data transmitter 101 may activate the path search procedure at selected timing and search for new paths. By periodically searching for paths, even when a communication environment changes, good communication paths can be ensured. The presence or absence of the communication period and the presence or absence of execution of the path search procedure are described in a beacon frame and are provided to the wireless data receiver 102.

In S1201, the wireless data receiver 102 sets a directional transmitting antenna and a directional receiving antenna in a communication path. In S1202, the wireless data receiver 102 determines whether a data frame has been received in a predetermined period (T1 period). When the wireless data receiver 102 receives a data frame, the wireless data receiver 102 proceeds to S1203. When the wireless data receiver 102 has not received a data frame for the predetermined period (T1 period), the wireless data receiver 102 proceeds to S1204.

In S1204, the wireless data receiver 102 switches the communication path to the auxiliary path. The fact that the wireless data receiver 102 has not received a data frame in S1202 means that path interruption is occurring in the main path, so the wireless data receiver 102 switches the communication path to the auxiliary path. To switch the communication path to the auxiliary path, the wireless data receiver 102 sets the transmitting antenna directivity and the receiving antenna directivity toward the auxiliary path and, after completing the setting of the antennas, proceeds to S1205. In S1205, the wireless data receiver 102 determines whether a data frame has been received in the predetermined period (T1 period). When the wireless data receiver 102 receives a data frame, the wireless data receiver 102 proceeds to S1203. When the wireless data receiver 102 has not received a data frame for the predetermined period (T1 period), the wireless data receiver 102 proceeds to S1206.

In S1206, the wireless data receiver 102 sets the receiving antenna directivity to the omni-directivity. The fact that the wireless data receiver 102 has not received a data frame for the predetermined period (T1 period) in S1205 means that path interruption has occurred in both the main path and the auxiliary path, and the wireless data receiver 102 needs to search for new paths. In S1207, the wireless data receiver 102 receives a path search activation signal. In S1208, the wireless data receiver 102 transmits a path search acknowledgement signal with the omni-directivity. In S1209, the wireless data receiver 102 executes the path search procedure together with the wireless data transmitter 101. In S1210, the wireless data receiver 102 determines whether the communication period is continuing based on the latest beacon frame transmitted by the wireless data transmitter 101. When the communication period is continuing, the wireless data receiver 102 proceeds to S1201. When the communication period is complete, the wireless data receiver 102 ends the process.

Figure 13:
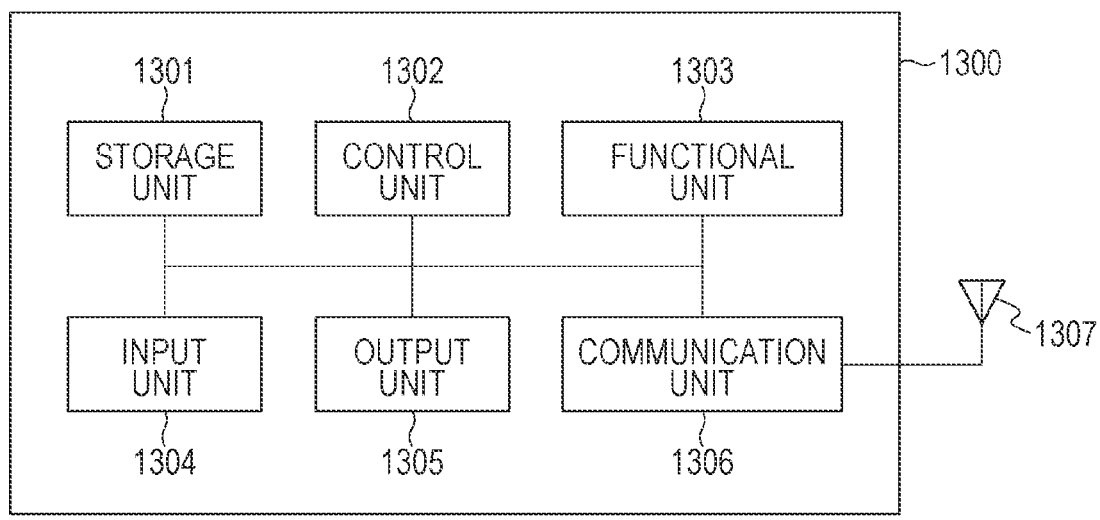
FIG. 13 is a diagram that shows the hardware configuration of the wireless data transmitter and receiver.

Next, the hardware configurations of the wireless data transmitter 101 and wireless data receiver 102 will be described. FIG. 13 is a block diagram that shows the hardware configurations of the wireless data transmitter 101 and wireless data receiver 102. The configuration shown in FIG. 13 is similar to those of the first embodiment and the second embodiment.

In FIG. 13, a storage unit 1301 is made up of one or multiple ROMs and RAMS and stores programs for performing the above-described various operations and various pieces of information, such as communication parameters for wireless communication. As the storage unit 1301, other than the memories, such as a ROM and a RAM, a storage medium, such as a flexible disk, a hard disk drive, an optical disk, a magnetooptical disk, a CD-ROM, a CD-R, a magnetic tape, a nonvolatile memory card, and a DVD, may be used.

A control unit 1302 is made up of one or multiple CPUs, MPUs, or the like, and controls the entire wireless data transmitter or receiver by running the programs stored in the storage unit 1301. The control unit 1302 may control the entire wireless data transmitter or receiver in cooperation with a running OS (operating system). The control unit 1302 executes a predetermined process, such as image capturing, printing, or projecting, by controlling a functional unit 1303. The functional unit 1303 is a hardware component for the wireless data transmitter or receiver to execute a predetermined process. For example, when the wireless data transmitter or receiver is a camera, the functional unit 1303 is an image pickup unit and performs an image capturing process. For example, when the wireless data transmitter or receiver is a printer, the functional unit 1303 is a printing unit and performs a printing process. For example, when the wireless data transmitter or receiver is a projector, the functional unit 1303 is a projecting unit and performs a projecting process. Data to be processed by the functional unit 1303 may be data stored in the storage unit 1301 or may be data obtained through communication with another communication apparatus via a communication unit 1306 (described later). An input unit 1304 receives various operations from a user. An output unit 1305 performs various outputs for a user. An output includes at least one of display on a screen, voice output through a speaker, vibration output, and the like. Both the input unit 1304 and the output unit 1305 may be implemented as one module like a touch panel. The communication unit 1306 controls wireless communication compliant with IEEE 802.11 series and controls IP communication. The communication unit 1306 transmits or receives a wireless signal for wireless communication by controlling an antenna 1307. The antenna 1307 radiates or absorbs electromagnetic waves for transmission and reception by the communication unit 1306.

The functional blocks shown in FIG. 2, FIG. 3, FIG. 8, and FIG. 9 may be provided by software or may be provided by hardware. When provided by software, the functions of those functional blocks are implemented, for example, when the control unit 1302 of the wireless data transmitter 101 or wireless data receiver 102 executes those functional blocks. On the other hand, when provided by hardware, the functional blocks each are made up of, for example, ASIC (application specific integrated circuit).

OTHER EMBODIMENTS

The present invention may be implemented by a process in which a program implementing one or more functions of the above-described embodiments is supplied to a system or apparatus via a network or a storage medium and one or more processors in a computer or the system or apparatus reads and runs the program. The present invention may also be implemented by a circuit (for example, ASIC) that implements one or more functions.

The present invention is not limited to the above-described embodiments and may be variously changed or modified without departing from the spirit and scope of the present invention. Therefore, to make the scope of the present invention public, the following claims are attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus capable of wireless communication via a first communication path and a second communication path, the communication apparatus comprising:
   one or more processors; and
   one or more memories storing instructions that, when executed by the one or more processors, cause the communication apparatus to:
   set a directivity of an antenna to a first directivity capable of wireless communication via the first communication path;
   send a signal to outside via the first communication path;
   set the directivity of the antenna to a second directivity capable of wireless communication via the second communication path in addition to wireless communication via the first communication path after the signal is sent to the outside via the first communication path; and
   based on a data reception condition from the outside in a state where the directivity of the antenna has been set to the second directivity, set the directivity of the antenna, based on a data reception condition from the outside, to 1) the first directivity capable of wireless communication via the first communication path or 2) a third directivity capable of wireless communication via the second communication path but not capable of wireless communication via the first communication path.

2. A communication method for performing wireless communication via a first communication path and a second communication path, the communication method comprising:
   setting a directivity of an antenna to a first directivity capable of wireless communication via the first communication path;
   sending a signal to outside via the first communication path;
   setting the directivity of the antenna to a second directivity capable of wireless communication via the second communication path in addition to wireless communication via the first communication path after the signal is sent to the outside via the first communication path; and
   based on a data reception condition from the outside in a state where the directivity of the antenna has been set to the second directivity, setting the directivity of the antenna to 1) the first directivity capable of wireless communication via the first communication path or 2) a third directivity capable of wireless communication via the second communication path but not capable of wireless communication via the first communication path.

3. The communication method according to claim 2, wherein the signal is an acknowledgement signal.

4. The communication method according to claim 2, wherein in a case where, from a destination apparatus of the signal, no signal has been received for a predetermined period, the second directivity is set as the directivity of the antenna.

5. The communication method according to claim 4, wherein in a case where a signal for switching to the second communication path is received within the predetermined period from the destination apparatus of the signal, the third directivity is set as the directivity of the antenna.

6. The communication method according to claim 2, wherein the first directivity is a directivity in which a beam of the antenna is formed in a direction based on the first communication path and the third directivity is a directivity in which a beam of the antenna is formed in a direction based on the second communication path.

7. The communication method according to claim 6, wherein the second directivity is an omni-directivity.

8. The communication method according to claim 6, wherein the first communication path is a main path, and the second communication path is an auxiliary path which is used in a case where a problem of communication via the first communication path occurs.

9. The communication method according to claim 8, the control method further comprising:
   performing a training process for communicating training data with the outside and determining the first communication path and the second communication path.

10. The communication method according to claim 9, wherein the training process is not performed in a sequence of processing for changing the directivity of the antenna based on the data reception condition from the outside.

11. A non-transitory computer readable storage medium storing instructions for causing a communication apparatus to perform a process, the communication apparatus capable of wireless communication with another communication apparatus via a first communication path and a second communication path, the process comprising:
   setting a directivity of an antenna to a first directivity capable of wireless communication via the first communication path;
   sending a signal to outside via the first communication path;
   setting the directivity of the antenna to a second directivity capable of wireless communication via the second communication path in addition to wireless communication via the first communication path after the signal is sent to the outside via the first communication path; and
   based on a data reception condition from the outside in a state where the directivity of the antenna has been set to the second directivity, setting the directivity of the antenna to 1) the first directivity capable of wireless communication via the first communication path or 2) a third directivity capable of wireless communication via the second communication path but not capable of wireless communication via the first communication path.

12. A communication method for performing wireless communication via a first communication path and a second communication path, the communication method comprising:
   setting a directivity of an antenna to a first directivity capable of wireless communication via the first communication path or the second directivity different from the first directivity capable of wireless communication via the second communication path;

sending a signal to outside by using the antenna to which the first directivity or the second directivity has been set; and setting the directivity of the antenna to a third directivity capable of wireless communication via the second communication path in addition to wireless communication via the first communication path, after the signal is sent to the outside via the antenna to which the first directivity or the second directivity has been set and before a predetermined time which is used to determine a problem of communication by using the antenna to which the first directivity or the second directivity has been set elapses.

* * * * *